(12) United States Patent
Larsson et al.

(10) Patent No.: US 12,715,461 B2
(45) Date of Patent: Aug. 25, 2026

(54) ADVANCED DRIVER ASSISTANCE SYSTEM SENSITIVITY ADJUSTMENTS

(71) Applicant: QUALCOMM Incorporated, San Diego, CA (US)

(72) Inventors: Annika Larsson, Gothenburg (SE); Klas Alenljung, Bohus (SE)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 18/334,214

(22) Filed: Jun. 13, 2023

(65) Prior Publication Data

US 2024/0416939 A1 Dec. 19, 2024

(51) Int. Cl.

| | |
|---|---|
| ***B60W 50/08*** | (2020.01) |
| ***B60W 30/095*** | (2012.01) |
| ***B60W 50/00*** | (2006.01) |
| ***G06F 3/01*** | (2006.01) |

(52) U.S. Cl.

CPC ...... *B60W 50/085* (2013.01); *B60W 50/0097* (2013.01); *G06F 3/013* (2013.01); *B60W 30/0956* (2013.01); *B60W 2540/225* (2020.02); *B60W 2552/00* (2020.02); *B60W 2554/4041* (2020.02); *B60W 2555/20* (2020.02); *B60W 2556/45* (2020.02)

(58) Field of Classification Search

CPC ........... B60W 50/085; B60W 50/0097; B60W 2554/4041; B60W 2552/00; B60W 2540/225; B60W 2556/45; B60W 2555/20; B60W 30/0956; G06F 3/013

See application file for complete search history.

(56) References Cited

U.S. PATENT DOCUMENTS

| | | | | |
|---|---|---|---|---|
| 11,305,766 B2 | 4/2022 | Hanna | | |
| 2004/0150514 A1 | 8/2004 | Newman et al. | | |
| 2013/0335213 A1* | 12/2013 | Sherony | G08G 1/167 340/439 | |
| 2015/0339589 A1* | 11/2015 | Fisher | G06V 10/454 706/12 | |
| 2017/0162197 A1* | 6/2017 | Cohen | G10L 15/22 | |
| 2017/0364147 A1* | 12/2017 | Canella | G06F 16/22 | |

(Continued)

FOREIGN PATENT DOCUMENTS

| | | |
|---|---|---|
| CA | 2827634 C | 5/2021 |
| CN | 104794856 B | 6/2018 |
| GB | 2582548 B | 10/2021 |

OTHER PUBLICATIONS

International Search Report and Written Opinion—PCT/US2024/031681—ISA/EPO—Aug. 27, 2024.

*Primary Examiner* — Mohamad O El Sayah

(74) *Attorney, Agent, or Firm* — Procopio, Cory, Hargreaves & Savitch LLP

(57) ABSTRACT

A user equipment (UE) may obtain an indication of a first gaze pattern of a driver of a vehicle from at least one memory. The UE may obtain a second gaze pattern of the driver of the vehicle based on a first set of sensor data from a first set of sensors associated with the vehicle during a first period of time. The UE may adjust a sensitivity of an advanced driver assistance system (ADAS) associated with the vehicle in response to a difference of visual engagement in a visual zone of the driver between the second gaze pattern and the first gaze pattern that is greater or equal than a threshold amount.

27 Claims, 14 Drawing Sheets

(56) References Cited

U.S. PATENT DOCUMENTS

2020/0139965 A1* 5/2020 Hanna ............... B60W 30/0956
2020/0207358 A1* 7/2020 Katz .................. G02B 27/0093
2021/0026353 A1* 1/2021 Luo ....................... G01S 17/931
2022/0121867 A1 4/2022 Arar et al.
2024/0362931 A1* 10/2024 Katz ...................... G06V 40/20
2024/0399830 A1* 12/2024 Salter ................... G07C 5/0841

* cited by examiner

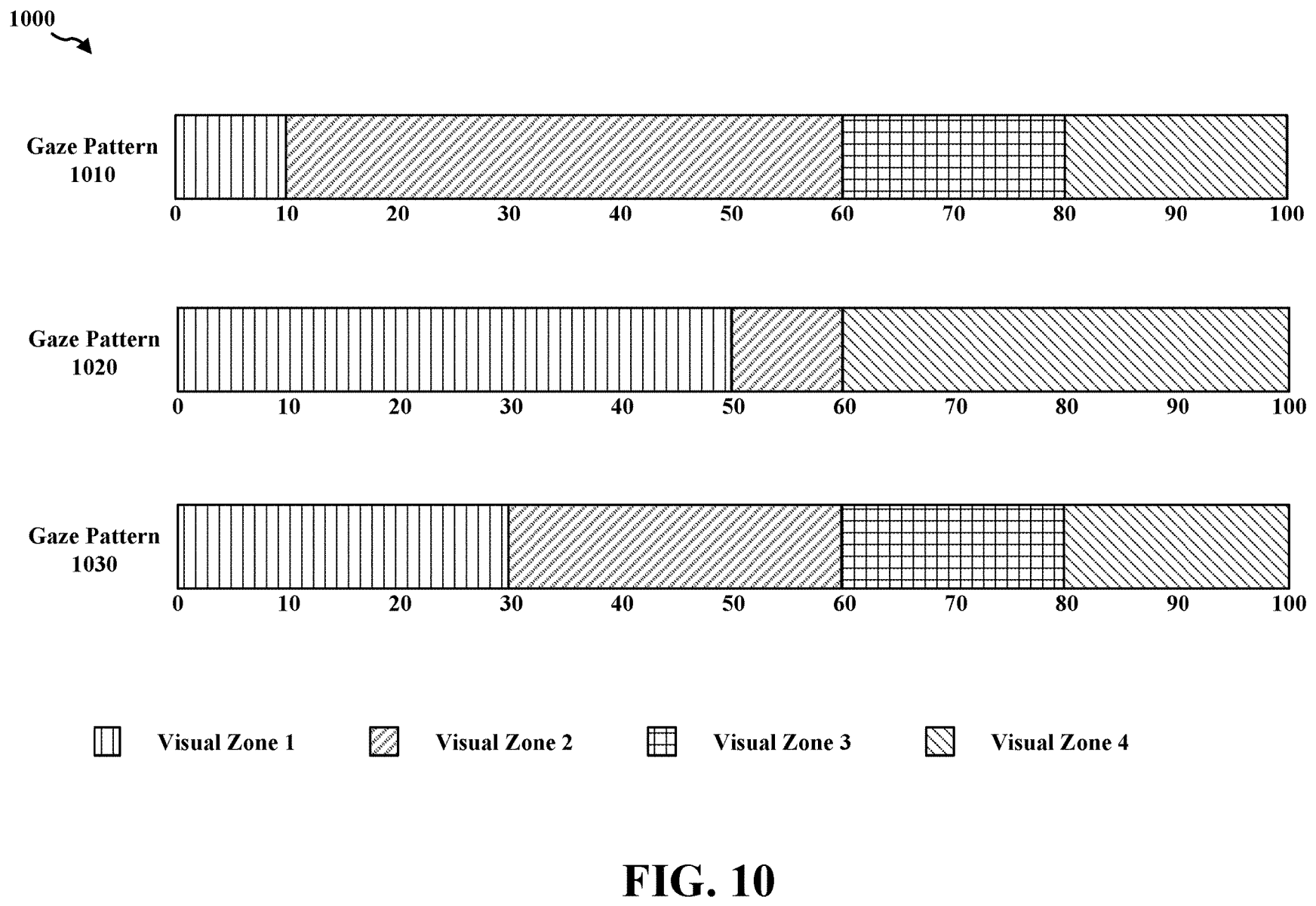

1000

Gaze Pattern 1010

Gaze Pattern 1020

Gaze Pattern 1030

0 10 20 30 40 50 60 70 80 90 100

Visual Zone 1

Visual Zone 2

Visual Zone 3

Visual Zone 4

FIG. 10

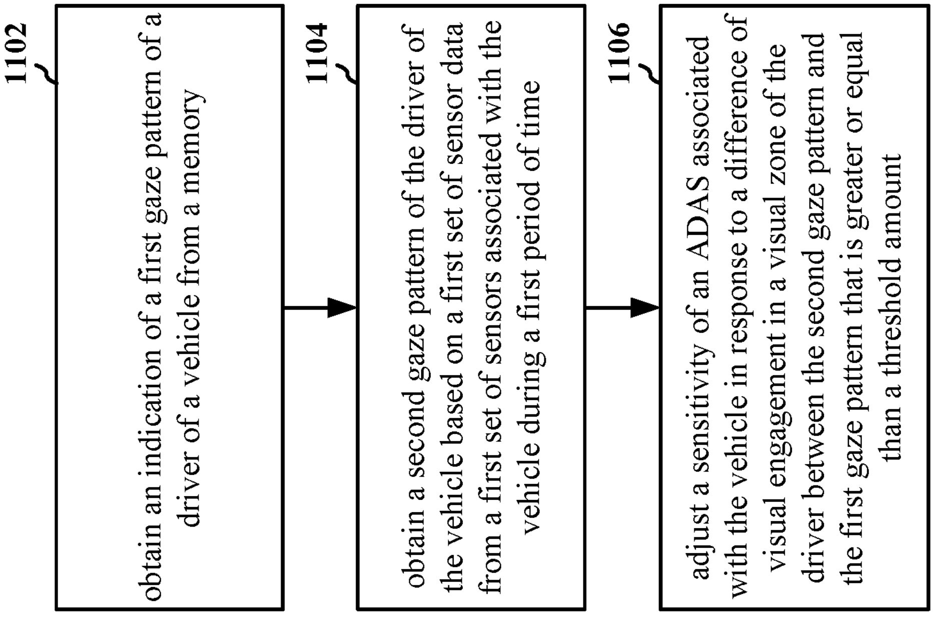
FIG. 11

ADVANCED DRIVER ASSISTANCE SYSTEM SENSITIVITY ADJUSTMENTS

TECHNICAL FIELD

The present disclosure relates generally to communication systems, and more particularly, to an advanced driver assistance system (ADAS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5 G New Radio (NR). 5 G NR is part of a continuous mobile broadband evolution promulgated by Third Generation Partnership Project (3GPP) to meet new conditions associated with latency, reliability, security, scalability (e.g., with Internet of Things (IoT)), and other conditions. 5 G NR includes services associated with enhanced mobile broadband (eMBB), massive machine type communications (mMTC), and ultra-reliable low latency communications (URLLC). Some aspects of 5 G NR may be based on the 4 G Long Term Evolution (LTE) standard. There exists a need for further improvements in 5 G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) associated with a vehicle. The apparatus may obtain an indication of a first gaze pattern of a driver of a vehicle from a memory. The apparatus may obtain a second gaze pattern of the driver of the vehicle based on a first set of sensor data from a first set of sensors associated with the vehicle during a first period of time. The apparatus may adjust a sensitivity of an advanced driver assistance system (ADAS) associated with the vehicle in response to a difference of visual engagement in a visual zone of the driver between the second gaze pattern and the first gaze pattern that is greater or equal than a threshold amount.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 10 is a diagram illustrating example aspects of a plurality of gaze patterns that may be associated with a driver of a vehicle.

FIG. 11 is a flowchart of a method of wireless communication.

DETAILED DESCRIPTION

Figure 1:
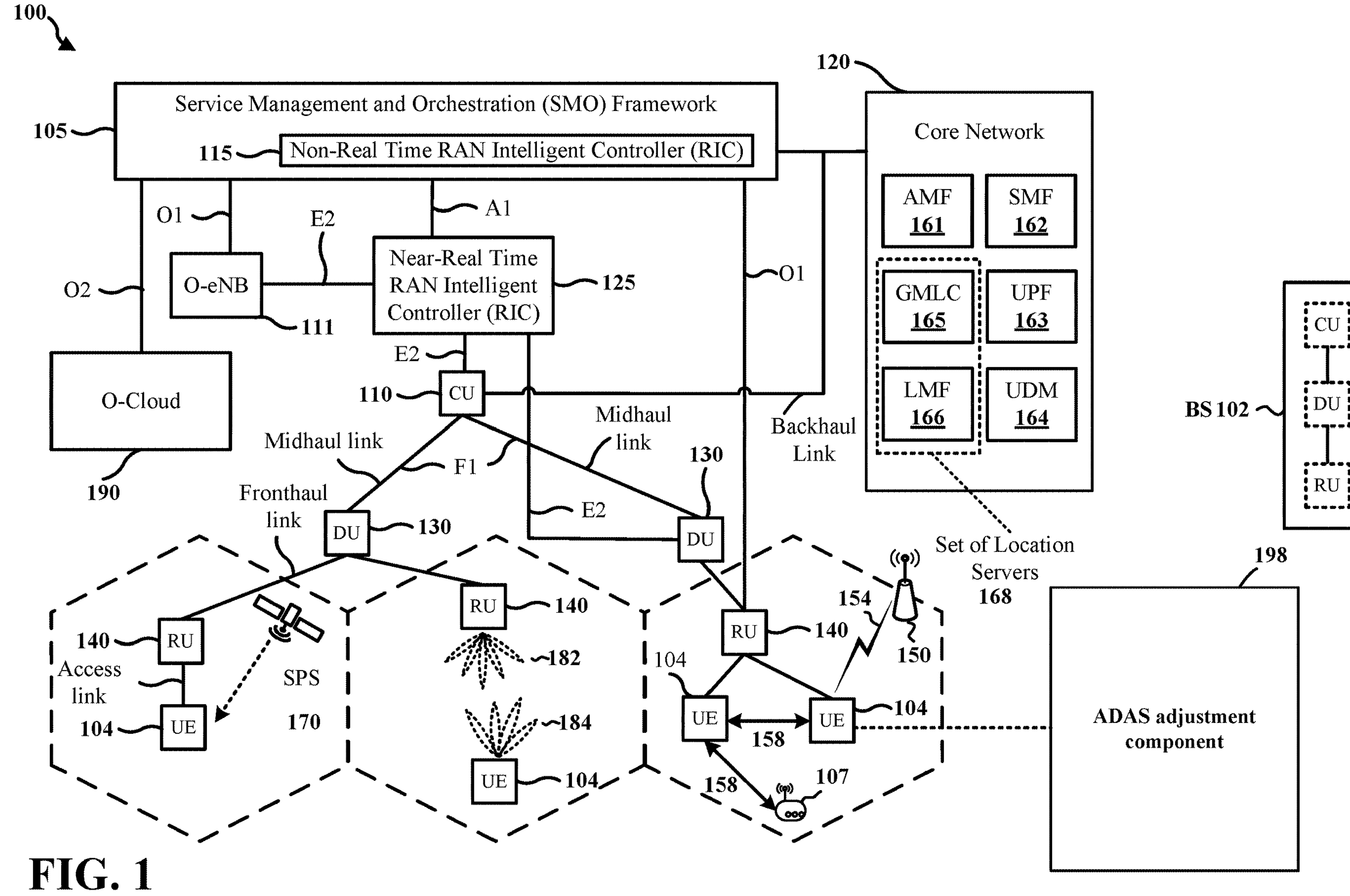
FIG. 1 is a diagram illustrating an example of a wireless communications system and an access network.

Various aspects relate generally to an advanced driver assistance system (ADAS). Some aspects more specifically relate to systems that adjust a sensitivity of the ADAS associated with a vehicle based on a gaze pattern of a driver of the vehicle. In some examples, a user equipment (UE) at a vehicle may be configured to adjust the sensitivity of the ADAS. The UE may obtain an indication of a first gaze pattern of a driver of a vehicle from a memory. The first gaze pattern may also be referred to as a typical gaze pattern, or a gaze pattern associated with what the driver of the vehicle typically gazes at given a context associated with the vehicle and/or an event associated with the vehicle. The UE may obtain a second gaze pattern of the driver of the vehicle based on a first set of sensor data from a first set of sensors associated with the vehicle during a first period of time. The second gaze pattern may also be referred to as a current gaze pattern, or a gaze pattern associated with the most recent period of time of gaze patterns captured by sensors monitoring the driver of the vehicle. The UE may adjust a sensitivity of an ADAS associated with the vehicle in response to a difference of visual engagement in a visual zone of the driver between the second gaze pattern and the first gaze pattern that is greater or equal than a threshold amount. In some aspects, a driver's typical gaze patterns may be analyzed over time and associated with the driver's location, different object types in the environment and/or the movements of the objects about the driver's vehicle. An analyzed gaze pattern may be for different periods of time (e.g., a 5-second period of time, a collection of 5-second periods of time, or a 5-minute period of time). In some aspects, a UE may analyze a full gaze period (e.g., the entire period of time) or may analyze subsets of a gaze period (e.g., a first 20% of a recorded gaze period, a most recent 20% of a recorded gaze period, a middle 20% of a recorded gaze period) or may analyze a gaze period captured as a function of a triggered event (first 5 seconds after entering one hundred meters from a traffic intersection, first 10 seconds after passing an exit on a freeway). A driver's current gaze/attention pattern may be compared against such a typical gaze/attention pattern or a conditional gaze/attention pattern to determine if there is a deviation between the current gaze/attention pattern and the typical gaze/attention pattern. A deviation may be categorized as a difference that is greater than equal to a threshold amount, such as greater or equal to 5% of the typical gaze pattern. If a deviation is detected, the sensitivity of the ADAS system may be increased. When the driver has an attention strategy different from what the driver typically has in that context/situation, the UE may increase the sensitivity of the ADAS to cover that situation. When the driver's attention pattern is not appropriately adapted to the infrastructure demands, the UE may increase the sensitivity of the ADAS to cover that situation.

Particular aspects of the subject matter described in this disclosure can be implemented to realize one or more of the following potential advantages. In some examples, by adapting the ADAS of a vehicle to the driver of the vehicle, the driver may receive emergency support further in advance than if the ADAS is adapted to the external world or to objects about the vehicle without taking into consideration the habits of the driver. In order to increase driver safety, responding sooner may be advantageous. In some aspects, a driver may look at a threat until the car crashes into the threat, which means that a direct connection between a driver monitoring system (DMS) and an ADAS may not help in such situations. By measuring attention patterns of drivers over time, and correlating those attention patterns to a core, or a typical, attention pattern of the driver, a UE may increase the sensitivity of the ADAS of a vehicle towards attention patterns that are atypical for the driver, without focusing on specific objects or threats that the driver may or may not be looking at during a threat situation. The described techniques can be used to ensure that a driver of a vehicle responds sooner and/or softer to a threat event since the ADAS is customized to the driver's typical gaze patterns, thereby avoiding an emergency collision avoidance scenario closer to the time of imminent impact.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units.

Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4 G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an ADAS adjustment component 198 that may be configured to obtain an indication of a first gaze pattern of a driver of a vehicle from a memory. The ADAS adjustment component 198 may be configured to obtain a second gaze pattern of the driver of the vehicle based on a first set of sensor data from a first set of sensors associated with the vehicle during a first period of time. The ADAS adjustment component 198 may be configured to adjust a sensitivity of an ADAS associated with the vehicle in response to a difference of visual engagement in a visual zone of the driver between the second gaze pattern and the first gaze pattern that is greater or equal than a threshold amount. In other words, the ADAS adjustment component 198 may be configured to compare a current gaze pattern of a driver against the typical gaze pattern of the driver. The current gaze pattern may be obtained from sensors monitoring the driver. The typical gaze pattern may be obtained from a memory, such as a memory of the UE 104 or a remote database that may transmit the typical gaze pattern to the UE 104. The ADAS adjustment component 198 may increase the sensitivity of the ADAS associated with the vehicle when the current gaze pattern diverges from the typical gaze pattern by a threshold amount. Doing so may allow the UE 104 to adjust a sensitivity of an ADAS in a user-specific manner based on the customary driving habits of the driver of a vehicle. The ADAS adjustment component 198 may increase the sensitivity of the ADAS when the attention of the driver is atypical and/or when the driver's attention does not correspond with a driver condition appropriate to a context associated with the vehicle and/or an event associated with the vehicle. In some aspects, the first gaze pattern that the ADAS adjustment component 198 obtains may be a prototypical, or a preferred gaze pattern of the driver.

In some aspects, the first gaze pattern may be a default gaze pattern saved in a memory of the UE 104, or may be an average gaze pattern of the driver captured when the driver is in a known optimal state (e.g., within 30 minutes of starting to drive a vehicle during business hours of a day).

Figures 2A, 2B, 2C, 2D:
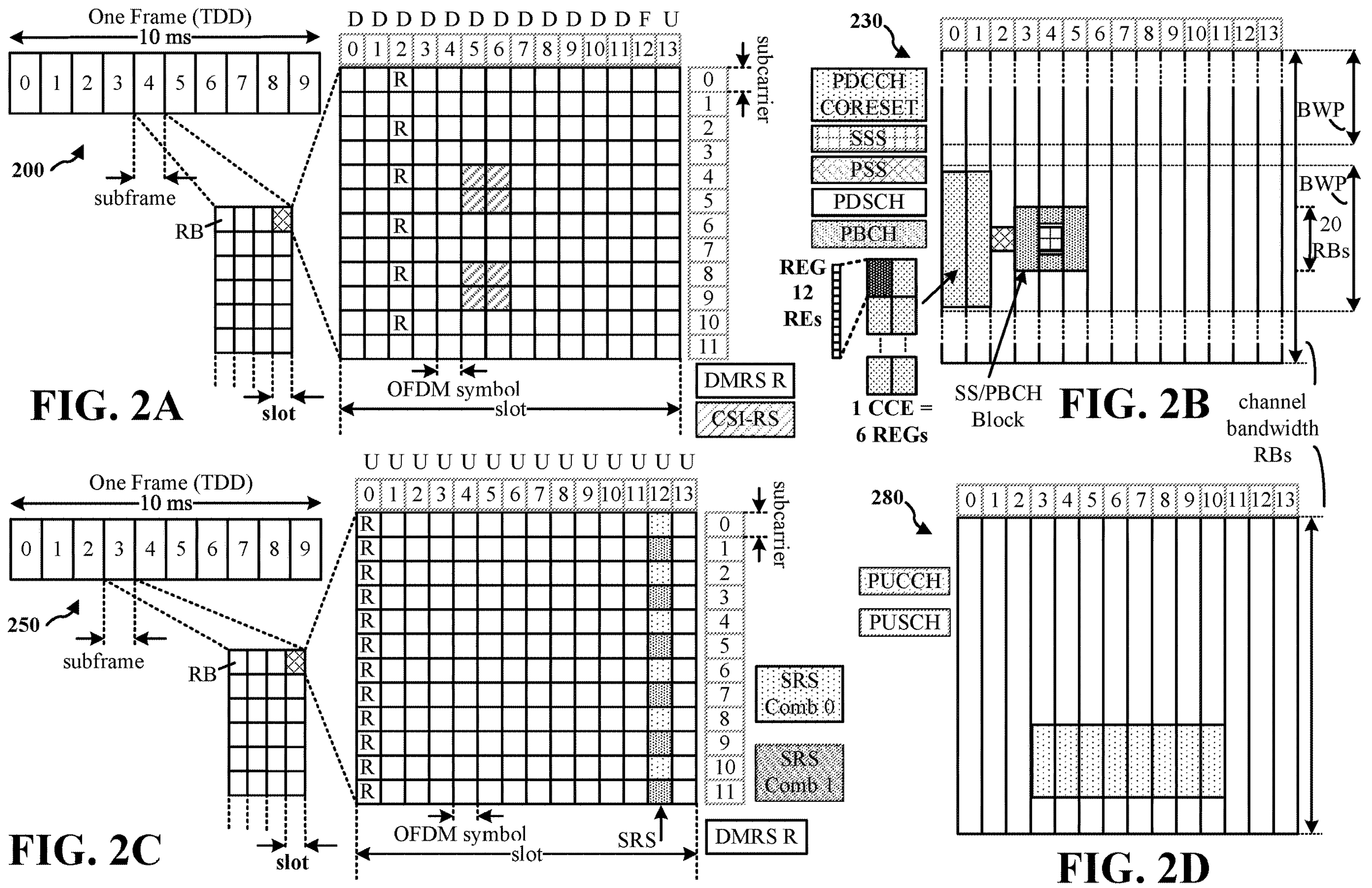
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A. 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
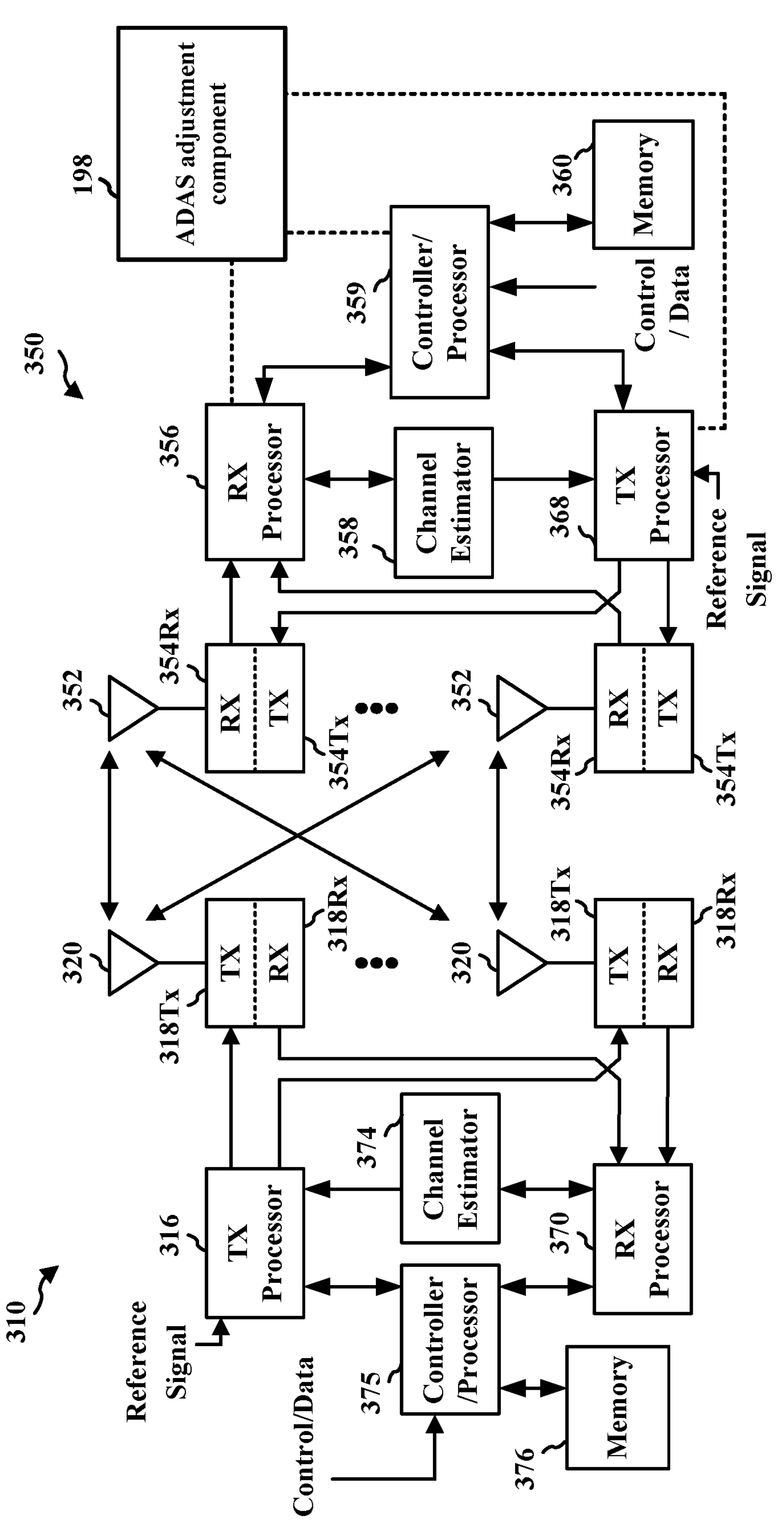
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the ADAS adjustment component 198 of FIG. 1.

Figure 4:
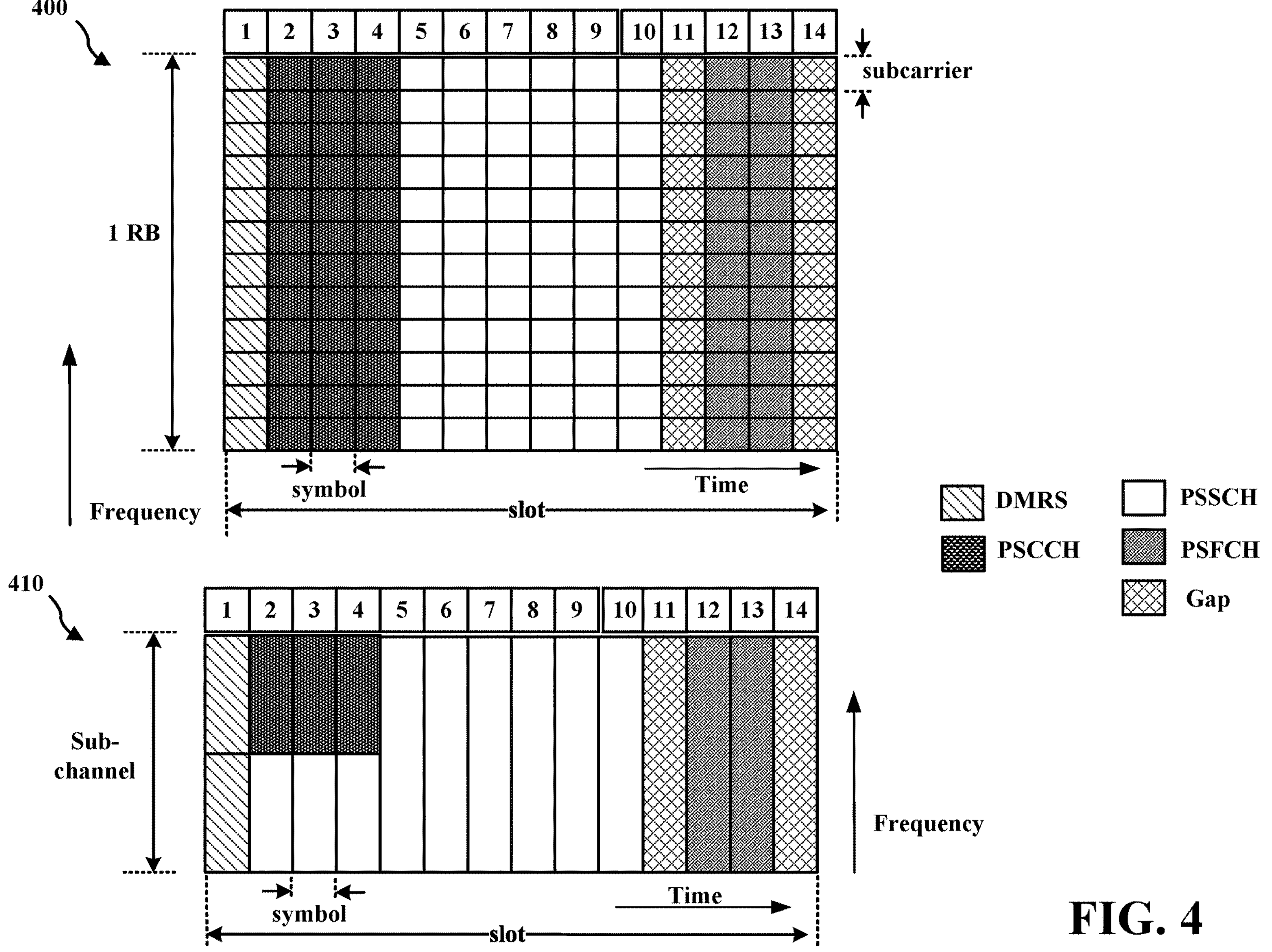
FIG. 4 is a diagram illustrating example aspects of a sidelink slot structure.

FIG. 4 includes diagrams 400 and 410 illustrating example aspects of slot structures that may be used for sidelink communication (e.g., between UEs 104, RSU 107, etc.). The slot structure may be within a 5 G/NR frame structure in some examples. In other examples, the slot structure may be within an LTE frame structure. Although the following description may be focused on 5 G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 4. Multiple slots may be aggregated together in some aspects.

Figure 5:
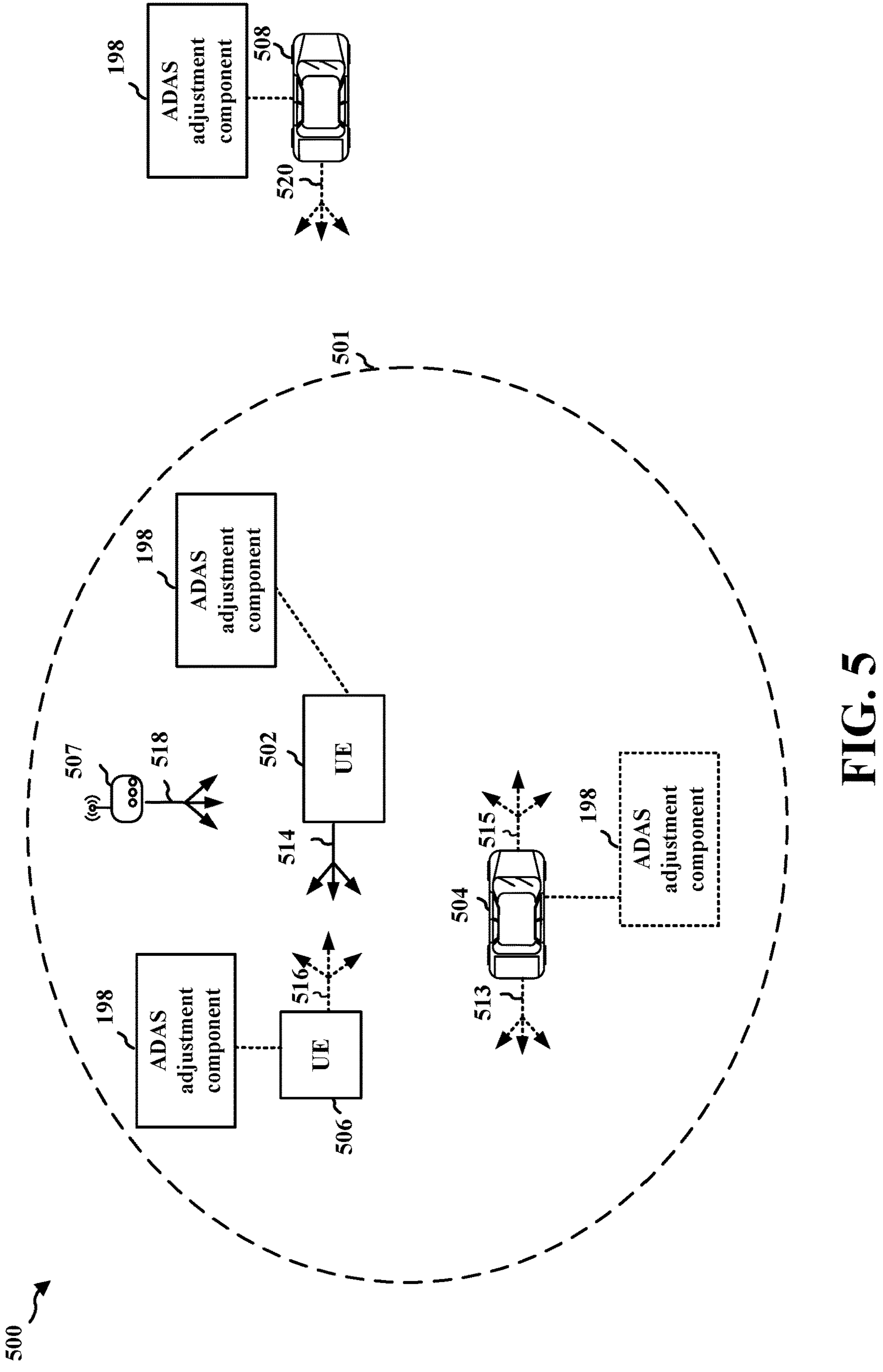
FIG. 5 is a diagram illustrating example aspects of sidelink communication between devices, in accordance with aspects presented herein.

FIG. 5 illustrates a diagram 500 of sidelink communication between devices. The communication may be based on a slot structure including aspects described in connection with FIG. 5. For example, the UE 502 may transmit a sidelink transmission 514, e.g., including a control channel (e.g., PSCCH) and/or a corresponding data channel (e.g., PSSCH), that may be received by UEs 504, 506, 508. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 502, 504, 506, 508 may each be capable of sidelink transmission in addition to sidelink reception. Thus, UEs 504, 506, 508 are illustrated as transmitting sidelink transmissions 513, 515, 516, 520. The sidelink transmissions 513, 514, 515, 516, 520 may be unicast, broadcast or multicast to nearby devices. For example, UE 504 may transmit sidelink transmissions 513, 515 intended for receipt by other UEs within a range 501 of UE 504, and UE 506 may transmit sidelink transmission 516. Additionally, or alternatively, RSU 507 may receive communication from and/or transmit communication 518 to UEs 502, 504, 506, 508. One or more of the UEs 502, 504, 506, 508 or the RSU 507 may include a ADAS adjustment component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 6:
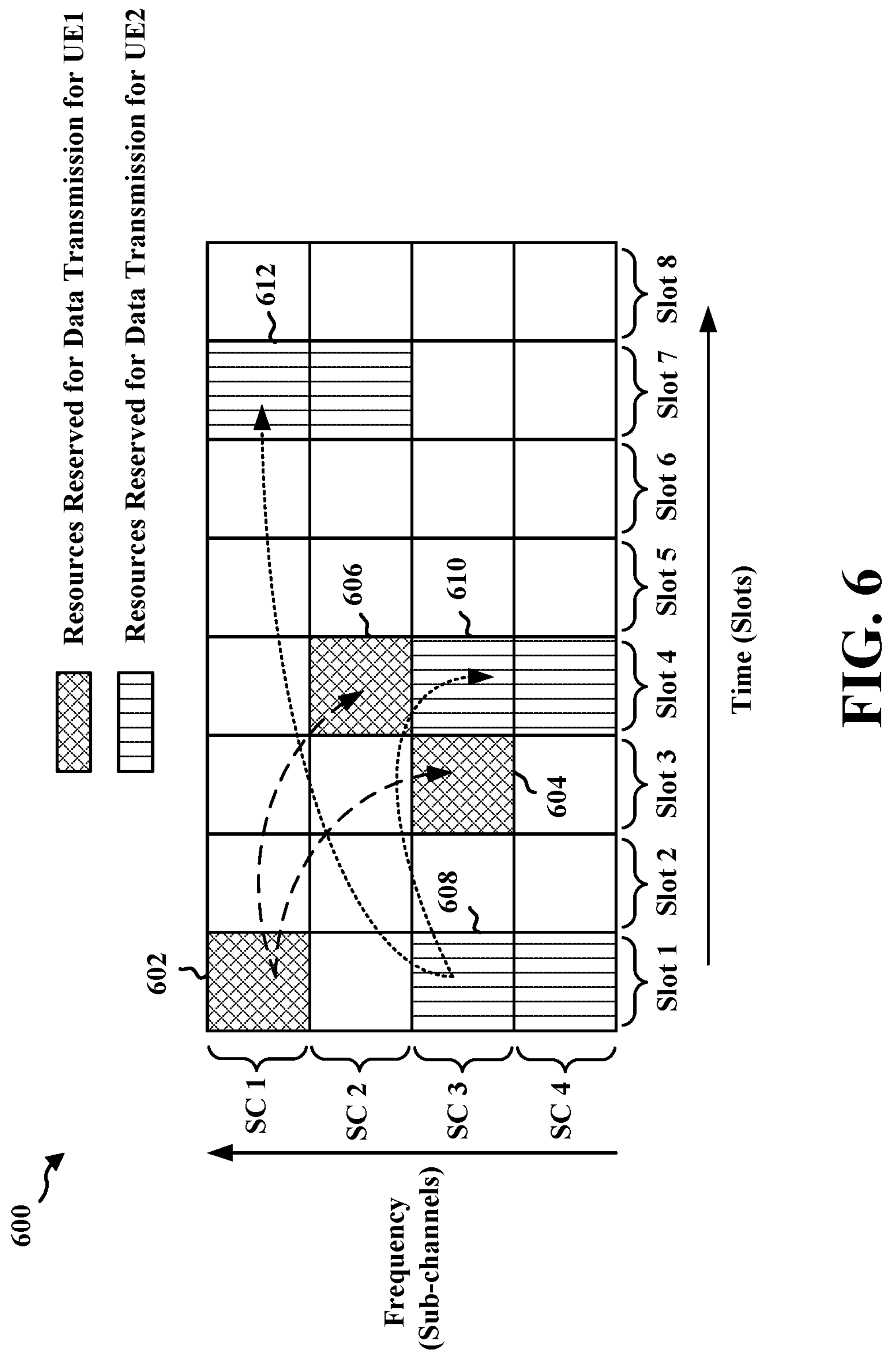
FIG. 6 is a diagram illustrating examples of resource reservation for sidelink communication.

FIG. 6 is an example 600 of time and frequency resources showing reservations for sidelink transmissions. The resources may be included in a sidelink resource pool, for example. The resource allocation for each UE may be in units of one or more sub-channels in the frequency domain (e.g., sub-channels SC1 to SC4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 600, which provides 32 available resource blocks in total. This window may also be referred to as a resource selection window.

A first UE ("UE1) may reserve a sub-channel (e.g., SC 1) in a current slot (e.g., slot 1) for its initial data transmission 602, and may reserve additional future slots within the window for data retransmissions (e.g., 604 and 606). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SC1, e.g., a first stage SC1. FIG. 6 illustrates that a second UE ("UE2") reserves resources in sub-channels SC 3 and SC 4 at time slot 1 for a data transmission 608, and reserve a data transmission 610 at time slot 4 using sub-channels SC 3 and SC 4, and reserve a data transmission 612 at time slot 7 using sub-channels SC 1 and SC 2 as shown by FIG. 6. Similarly, UE2 may transmit the resource usage and reservation information to other UE(s), such as using the reservation resource field in SC1.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 6 illustrates resources being reserved for an initial transmission and two retransmissions, the reservation may be for an initial transmission and a single transmission or just for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 6, the UE may transmit SCI reserving resources for data transmissions 608, 610, and 612.

Figure 7:
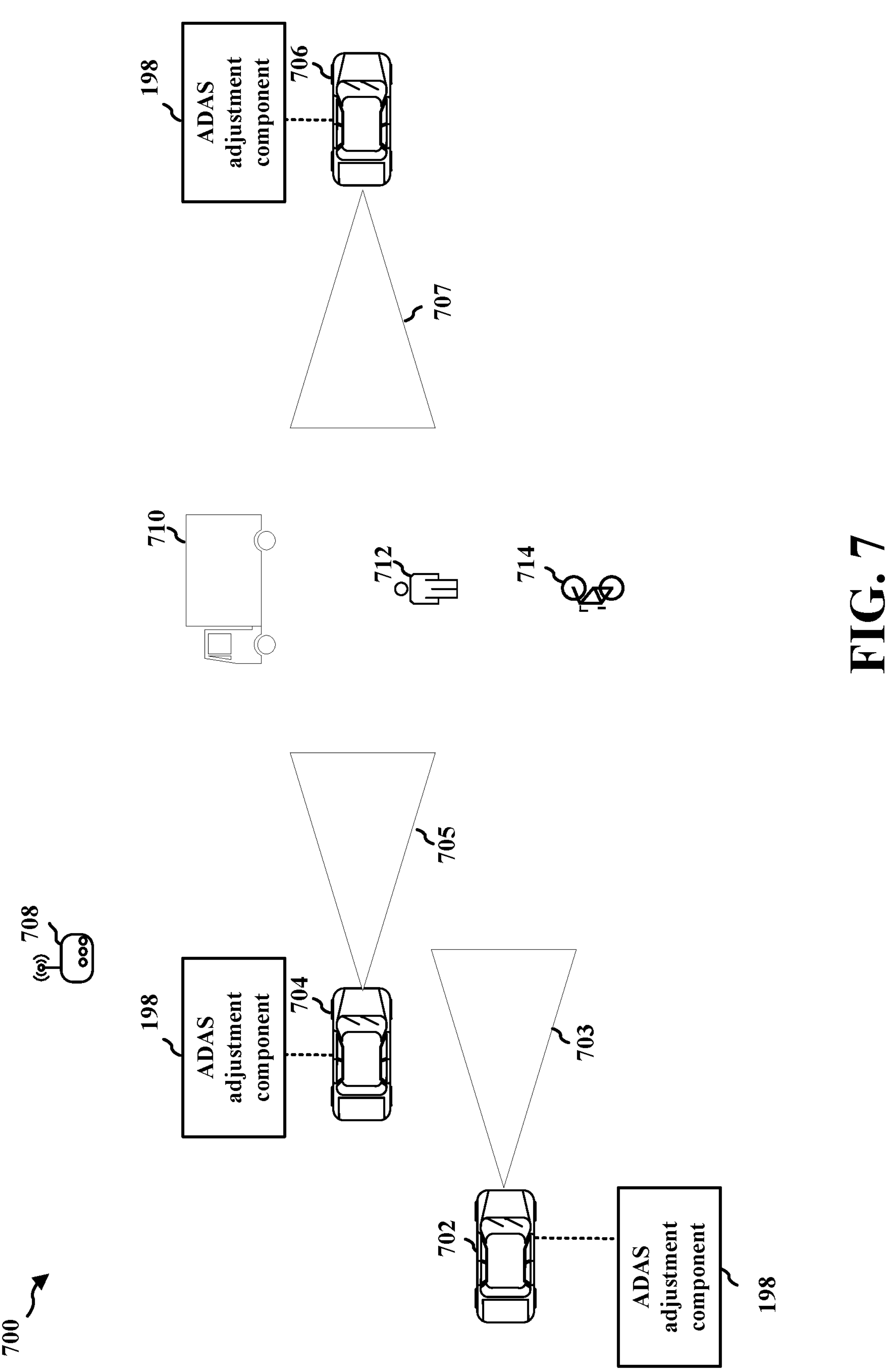
FIG. 7 is a diagram illustrating example aspects of UEs having sensors that may be configured to sense objects about the UEs.

FIG. 7 is a diagram 700 illustrating an example of a set of UEs, such as the UEs 702, 704, and 706 configured to detect one or more of a set of objects, such as the objects 710, 712, and 714. The UEs may be configured to communicate with one another via a D2D communication link, such as sidelink or V2X. The UEs 702, 704, and 706 may have a set of sensors that may be used to sense objects outside of the vehicle. The UEs 702, 704, and 706 may have a set of sensors that may be used to sense a driver within the vehicle. The set of sensors may include at least one of a light detection and ranging (LIDAR) sensor, a radio detection and ranging (RADAR) sensor, a sound navigation and ranging (SONAR) sensor, a thermal sensor, a microphone, or a camera. The set of sensors that sense the driver within the vehicle may be configured to sense a head pose of the driver, such as a direction that the driver's head is facing and an angle of the driver's head. The set of sensors that sense the driver within the vehicle may be configured to sense an eye gaze direction of the driver. The set of sensors that sense the driver within the vehicle may be configured to sense a body pose of the driver, such as a direction that the driver's body is leaning, a degree to which the driver is slouching, or whether a portion of the driver's body (e.g., an elbow, a knee) is supported by a portion of the vehicle (e.g., an armrest, a console).

The set of sensors of a UE may be configured to detect objects within a detection area, or a set of potential driving paths, about the UE. A detection area may be an area about the UE for which a sensor of the UE may detect sensor data, for example an object on a road or a sidewalk near the UE. A driving path, or a potential driving path, may be a driving path to which portions of the UE will eventually move based on a velocity and a direction, or a velocity, acceleration, and a direction, of the UE taken at a point in time if a driving change is not made, for example applying a brake, turning a steering wheel, or honking to signal another vehicle of a possible imminent collision. In one example, the UE 702 may have a detection area within the detection direction 703, within which the UE 702 may detect an object, such as the object 710, the object 712, or the object 714. The UE 704 may have a detection area within the detection direction 705, within which the UE 704 may detect an object, such as the object 710, the object 712, or the object 714. The UE 706 may have a detection area within the detection direction 707, within which the UE 706 may detect an object, such as the object 710, the object 712, or the object 714. One or more of the UEs 702, 704, and/or 706 may be configured to analyze a movement pattern of the set of objects, such as the object 710, the object 712, and/or the object 714, for example a predicted movement within the next five seconds, and may be configured to track a distance of the object from the vehicle.

A driving path may be specific to a state of the UE. For example, the driving path may include an area in front of a vehicle if the vehicle's state is in the forward driving state, but the driving path may include an area behind the vehicle if the vehicle's state is in the reverse driving state. A detection area may be based on a configuration of a set of sensors and/or a state of the vehicle associated with the UE, for example a direction that a camera is pointed and/or an orientation of the vehicle.

The RSU 708 may coordinate communications between the UEs 702, 704, and 706. In one aspect, the UE 702 may communicate with the RSU 708 to determine UEs located about the UE 702. In another aspect, the UE 702 may communicate with the RSU 708 to request a set of UEs to detect objects within a sensor area. In another aspect, the UE 702 may communicate with the RSU 708 and may allow the RSU 708 to coordinate the UEs 702, 704, and 706 to detect objects within a sensor area. In another aspect, the UE 702 may transmit a data transmission, for example data about an object about the UE 702, whether or not in a driving path of the UE 702, and the RSU 708 may then broadcast the data to other UEs, such as the UE 704 and/or the UE 706.

While the diagram 700 shows the UEs 702, 704, and 706 having detection directions 703, 705, and 707, respectively, each of the UEs may have more or less directions in which a set of sensors may detect objects about the vehicle. More or less UEs may be configured to coordinate with one another to sense objects within one or more sensor areas.

Figure 8A:
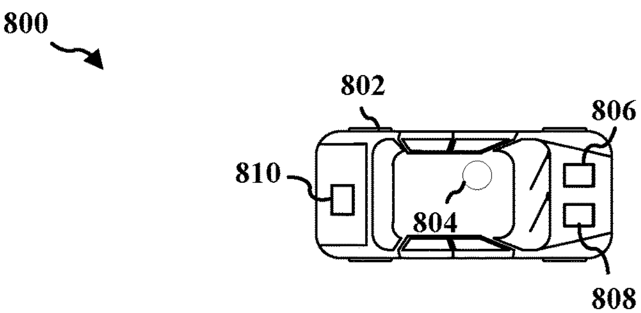
FIG. 8A is a diagram illustrating example aspects of a UE having a first set of sensors that monitor visual zones associated with a driver of the vehicle and a second set of sensors that monitor driving paths associated with the vehicle.

FIG. 8A is a diagram 800 illustrating a UE 802 having a set of sensors 806 that monitor visual zones associated with the driver 804 of the UE 802 and a set of sensors 808 that monitor driving paths associated with the UE 802. The UE 802 is shown as a vehicle, but may be a mobile device associated with a vehicle that the driver 804 drives. The set of sensors 806 may include a driver occupant system (DMS) and/or an occupant monitoring system (OMS) that monitors a gaze direction of the driver 804. The gaze direction of the driver 804 may include a direction and at least one area. The area may include a focused area and a peripheral vision area. In some aspects, the UE 802 may have two gaze direction analysis, one for the focused area of the driver 804 and another for the peripheral vision area of the driver 804. In one example, the set of sensors 806 may include at least one of a camera, a LIDAR sensor, or a thermal sensor aimed at the head over the driver 804, monitoring the direction of the head over driver 804 and the direction that the driver 804 looks at. The set of sensors 808 may monitor one or more driving paths associated with the UE 802. The set of sensors 808 may include at least one of a LIDAR sensor, a RADAR sensor, a SONAR sensor, a thermal sensor, a microphone, or a camera. In some aspects, the set of sensors 806 may include a set of cameras that capture attributes of the driver 804, such as the driver's posture, head forward-facing angle, and/or eye gaze, and the set of sensors 808 may include a set of cameras that capture areas about the UE 802, such as areas in front of the vehicle and areas behind the vehicle. The UE 802 may be configured to adjust an ADAS 810, for example increasing or decreasing a sensitivity of the ADAS 810. The sensitivity of the ADAS 810 may correspond with one or more thresholds of the ADAS. For example, the ADAS 810 may be configured to trigger an action (e.g., applying brakes to a vehicle via an automatic emergency braking (AEB) system) when the UE 802 calculates that an object (e.g., the object 866) within the driving path 862 of the UE 802 has a time to collision (TTC) value that is less than or equal to a threshold value, such as three seconds. Increasing the sensitivity of the ADAS 810 may alter the threshold from three seconds to five seconds, and decreasing the sensitivity of the ADAS 810 may alter the threshold from three seconds to two seconds. In another example, the ADAS 810 may be configured to trigger an action (e.g., a visual alert to the driver 804) when a vehicle within the driving path 862 of the UE 802 is within 30 meters of the UE 802 when the UE 802 is moving faster than 10 meters per second (m/s). Increasing the sensitivity of the ADAS 810 may alter the threshold from 30 meters to 20 meters, and decreasing the sensitivity of the ADAS 810 may alter the threshold from 30 meters to 40 meters. In another example, the ADAS 810 may be configured to trigger an audio alert, such as an audio sound having 60 dB of volume, in response to a vehicle being within 30 meters of the UE 802 when the UE 802 is moving faster than 10 m/s. Increasing the sensitivity of the ADAS 810 may alter the alert from an audio alert having 60 dB to an audio alert having 70 dB. Decreasing the sensitivity of the ADAS 810 may alter the alert from an audio alert having 60 dB to an audio alert having 50 dB. In some aspects, a driving path monitored by the UE 802 may be wider than a predicted driving path of the vehicle. For example, the UE 802 may monitor objects that are predicted to be within the driving path 863 within a threshold period of time. The driving path 863 may be larger (e.g., three times wider) than an actual predicted driving path of the vehicle to provide heightened sensitivity and safety monitoring triggers.

Figure 8B:
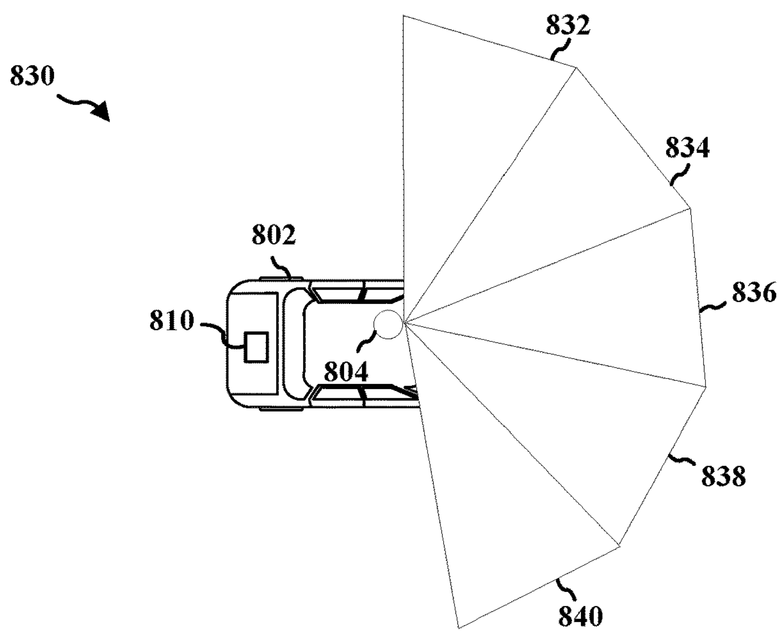
FIG. 8B is a diagram illustrating the UE of FIG. 8A and visual zones associated with the driver of the vehicle.

FIG. 8B is a diagram 830 illustrating the UE 802 having a plurality of visual zones, such as the visual zone 832, the visual zone 834, the visual zone 836, the visual zone 838, and the visual zone 840 associated with the driver 804. While the diagram 830 illustrates the driver 804 being associated with five visual zones, the UE 802 may associate the driver 804 with more or less visual zones. In some aspects, the UE 802 may divide a zone of possible areas that the driver 804 may look at into equal visual zones, for example dividing an 180-degree area into six areas of 30 degrees. In some aspects, the UE 802 may associate the driver 804 with visual zones associated with portions of the interior of the vehicle, for example the windshield, the rearview/sideview mirrors, the instruments (e.g., the speedometer, the rpm meter), the infotainment system, and/or the interior of the vehicle (e.g., the seats, the floorboard). The set of sensors 806 may be configured to analyze the gaze pattern of the driver 804 over one or more periods of time, for example repeatedly over a 2-second or a 5-second period of time.

Figure 8C:
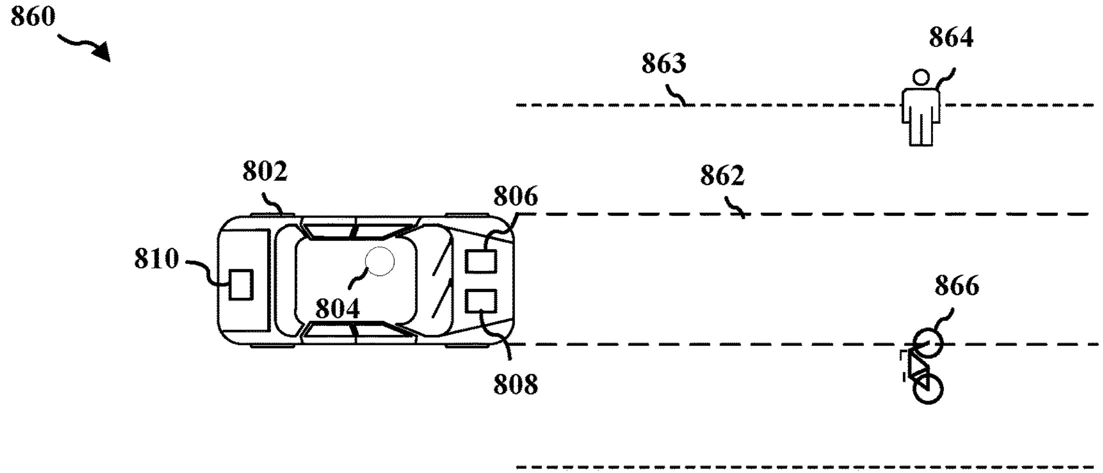
FIG. 8C is a diagram illustrating the UE of FIG. 8A and a driving path associated with the vehicle.

FIG. 8C is a diagram 860 illustrating the UE 802 having a set of sensors 808 configured to monitor the driving path 862 or the driving path 863 associated with the UE 802. The driving path 862 may include an area in front of the vehicle associated with the UE 802 where the vehicle may drive assuming the direction, velocity, and/or acceleration of the vehicle captured during a period of time, or at a period of time, is constant. The driving path 862 may contain one or more objects that may be hazards to the vehicle. For example, the driving path 862 may have an object 866, which may be a bicycle that may be struck by the vehicle if the vehicle maintains its same speed and direction. The driving path 862 may not have a person 864, which may be located on a sidewalk near the road of the vehicle associated with the UE 802. The driving path 863 may include an area to the sides of the driving path 862, providing for heightened monitoring of areas where a sudden shift by the driver 804, or of one of the objects within the driving path 862, may endanger the vehicle or one of the objects. Such larger driving path considerations may be particularly useful where a monitored object may include another vehicle traveling parallel with the UE 802, such as a bicycle in a bike lane or a pedestrian on a sidewalk.

Figure 9:
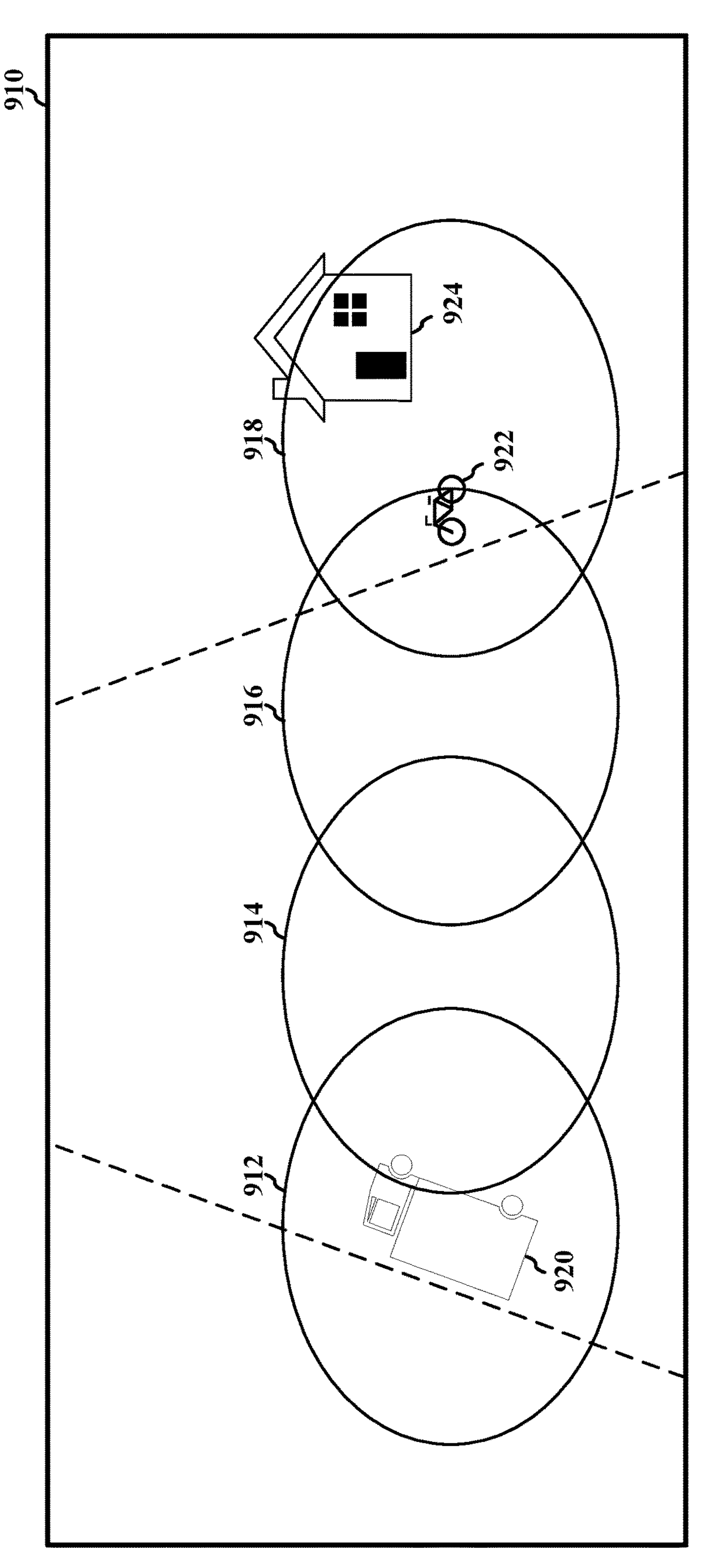
FIG. 9 is a diagram illustrating example aspects of a plurality of visual zones associated with a driver of a vehicle

FIG. 9 is a diagram 900 illustrating a virtualized windshield 910 having a plurality of visual zones, such as the visual zone 912, the visual zone 914, the visual zone 916, and the visual zone 918. The virtualized windshield 910 may indicate gaze directions that a driver may look. For example, in the visual zone 912, the left side of a road with a truck 920 to the left of the vehicle may be sensed by a set of sensors. In the visual zone 914, no objects may be sensed by a set of sensors. In the visual zone 916, the right side of a road with a bicycle 922 may be sensed by a set of sensors. In the visual zone 918, the right side of a road with a bicycle 922 and a house 924 may be sensed by a set of sensors.

In some aspects, the UE may store a gaze pattern of a driver of a vehicle as a set of attributes over a period of time. For example, the order that the driver looks at the different visual zones, the direction of the visual zone with respect to the driver, or a point of the vehicle (e.g., a center of the vehicle, a front of the hood of the vehicle), a location of the visual zone on a map, and/or a timestamp for each attribute.

FIG. 10 is a diagram 1000 illustrating a set of gaze patterns, such as the gaze pattern 1010, the gaze pattern 1020, and the gaze pattern 1030, which may be associated with a driver of a vehicle. A gaze pattern may represent the percent of time that a driver looks in that visual zone during a period of time, for example a two second, a five second, or a ten second period of time. The gaze pattern 1010 may represent a driver that looks in visual zone 1 for 10% of the period of time, in visual zone 2 for 50% of the period of time, in visual zone 3 for 20% of the period of time, and in visual zone 4 for 20% of the period of time. The gaze pattern 1020 may represent a driver that looks in visual zone 1 for 50% of the period of time, in visual zone 2 for 10% of the period of time, and in visual zone 4 for 40% of the period of time. The gaze pattern 1030 may represent a driver that looks in visual zone 1 for 30% of the period of time, in visual zone 2 for 30% of the period of time, in visual zone 3 for 20% of the period of time, and in visual zone 4 for 20% of the period of time.

An analyzed gaze pattern may be for different periods of time (e.g., a 5-second period of time, a collection of 5-second periods of time, or a 5-minute period of time). In some aspects, a UE may analyze a full gaze period (e.g., the entire period of time) or may analyze subsets of a gaze period (e.g., a first 20% of a recorded gaze period, a most recent 20% of a recorded gaze period, a middle 20% of a recorded gaze period, a combination thereof) or may analyze a gaze period captured as a function of a triggered event (first 5 seconds after entering one-hundred meters from a traffic intersection, first 10 seconds after passing an exit on a freeway).

The gaze pattern 1010 may represent a current gaze pattern of a driver, the gaze pattern 1020 may represent a typical gaze pattern of a driver associated with an event of the vehicle, and the gaze pattern 1030 may represent a typical gaze pattern of a driver associated with a context of the vehicle. A UE may compare the current gaze pattern of the driver against a typical gaze pattern of the driver with respect to a context that the driver is in, for example a location of the vehicle (e.g., latitude, longitude, elevation), an orientation of the vehicle (e.g., whether the vehicle is oriented west, cast, or directionally from a northern direction), a time pattern associated with when the typical gaze pattern was captured (e.g., time of day, day of week, weekend, weekday), a weather pattern (e.g., whether it's raining, sunny, foggy), or a road attribute (e.g., approaching an intersection, within an intersection). A UE may compare the current gaze pattern of the driver against a typical gaze pattern of the driver with respect to an event that the vehicle is associated with, for example the presence of a set of objects within a driving path of the vehicle (e.g., whether an obstacle is in the driving path), a movement of the set of objects within the driving path of the vehicle (e.g., how quickly an object is moving within the driving path), or a predicted movement of the set of objects within the driving path of the vehicle (e.g., whether a detected object is moving into the driving path).

In some aspects a gaze pattern may be associated with an order of the gazes. For example, if the zones of a driver's gaze are divided into zones one, two, three, four, and five, for one gaze pattern the driver may look at zone one, then three, then five, and for another gaze pattern the driver may look at zone three, then five, then one. In some aspects, a UE may save an order of movement between the zones as part of a gaze pattern, for use in analysis of a current gaze pattern against a typical gaze pattern. In some aspects, a gaze pattern may include a set of objects about the vehicle, a gaze direction, and a correlation between the two (e.g., looking directly at the object, looking at the object in a peripheral vision, not looking at the object).

Referring back to FIGS. 8A-8C, a UE 802 may be configured to assess an attention pattern of the driver 804 based on data from a set of sensors monitoring the driver 804. The attention pattern may be similar to the gaze pattern 1010, 1020, or 1030 in FIG. 10. For example, the attention pattern may include a time window for the gaze of the driver 804 over angles or zones with respect with the driver's location in the vehicle (e.g., left front window, rearview mirror, 30-40 degrees to the right). The UE 802 may store that attention pattern in a memory, for example a memory of the UE 802 or may transmit a report of the attention pattern to a remote database via a base station. In some aspects, the UE 802, or a computer system that receives the attention pattern, may store the attention pattern in a database of saved attention patterns associated with the driver 804 of the vehicle. The attention patterns may be associated with a contextual identifier, for example 5-second attention pattern recordings of the driver 804 when approaching an intersection, or 10-second attention pattern recordings of the driver 804 when driving on a freeway between 30 to 70 miles per hour, or 10-second attention pattern records of the driver 804 when driving on a freeway below 30 miles per hour. The attention pattern storage device, such as the UE 802, may calculate an average, mean, or median of a set of attention patterns associated with a context to generate a typical attention pattern associated with the context of the driver 804.

In some aspects, UE 802 may utilize sensor data from the set of sensors 806 may analyze the gaze patterns of the driver 804 using a DMS or an OMS. The UE 802 may contextualize the sensor data, for example a direction of the gaze, a location of the head, and an order that the driver 804 looks at different visual zones within a period of time. The UE 802 may associate the sensor data with a unique identifier (ID) of the driver 804, for example a driver's license or a user ID. The UE 802 may identify the driver 804 using any suitable means, for example by performing facial recognition on the driver 804 by analyzing sensor data from a camera, or by analyzing sensor data from a radio frequency identification (RFID) sensor that scans an RFID chip held by the driver 804. The UE 802 may associate the captured sensor data with an attribute of the vehicle, such as a location and a direction/orientation of the vehicle, a time pattern (e.g., time of day, day of week, week of month, date), a weather pattern (e.g., clear skies, cloudy, foggy, light rain, heavy rain, thunderstorms), and/or a road attribute (e.g., private, public, paved, unpaved). The UE 802 may obtain a location of the vehicle using any suitable means, for example by tracking the vehicle on a digital map, using a GNSS or a GPS sensor, or receiving a zone location via a V2X signal. In some aspects, the UE 802 may contextualize the attribute to select a typical gaze pattern.

In some aspects, the UE 802 may select a typical gaze pattern based on a contextualized current gaze pattern. For example, the UE 802 may determine that the vehicle is within one-hundred meters of an intersection and is driving towards the intersection, contextualizing the UE 802 as being in an "approaching the intersection" state, and may select a typical gaze pattern and/or a set of attention conditions based on the context. In another example, the UE 802 may determine that the vehicle is on a highway traveling below 70 miles per hour as being in a "freeway cruising" state, and may select a typical gaze pattern and/or a set of attention conditions based on the context. A set of attention conditions may be selected based on a location of the UE 802, a set of sensed objects about the vehicle, and/or based on machine-learning comparison of historical triggers that may affect an attention of the driver 804. For example, the UE 802 may select a first set of attention conditions based on sensing a bicycle within 100 meters of the UE 802 traveling in a bicycle lane next to a lane that the UE 802 is currently driving in, and may select a second set of attention conditions based on not sensing a bicycle within 100 meters of the UE 802 traveling in such a lane. A set of attention conditions may include thresholds that may be used to select a subset of a plurality of typical gaze patterns. For example, a set of attention conditions may include a location, a minimum attention threshold associated with a location/direction associated with a road geometry of the location, a minimum attention threshold associated with a type of object, and/or a minimum attention threshold associated with a direction. In some aspects, the UE 802 may build a database of a plurality of typical gaze patterns based on gaze patterns specific to the driver 804 of the UE 802. In some aspects, the UE 802 may retrieve attention conditions from a database of a plurality of attention conditions based on conditions that for any driver of the UE 802. In other words, the typical gaze patterns may be specific to the driver 804 of the UE 802 and the attention conditions may be general thresholds applicable to any driver of the UE 802.

In some aspects, the UE 802 may select a typical gaze pattern from a plurality of typical gaze patterns stored on a memory based, at least in part, on the location of the vehicle, the orientation of the vehicle, a time of day, a day of the week, the date of the day, movement patterns of objects about the vehicle (e.g., bikes, pedestrians, cars) (e.g., type of movement, predicted movement, direction of movement relative to the vehicle), locations of objects with respect to the vehicle (e.g., bikes, pedestrians, cars, buildings, walls, signs), presence/absence of objects about the vehicle, and/or a context generated based on at least one of the aforementioned attributes associated with the vehicle. In some aspects, the UE 802 may select a typical gaze pattern based on a set of conditions associated with a context or an attribute of a set of objects about the vehicle. A set of conditions may include, for example, a gaze direction (e.g., directly at an object, indirectly at an object, not at an object), a minimum amount of time associated with a set of gaze directions, or a minimum amount of time associated with an object. The UE 802 may filter out some of the potential typical gaze patterns from being selected based on the set of conditions, or may select a subset of the plurality of typical gaze patterns based on the set of conditions (e.g., select the subset of typical gaze patterns that have a minimum amount of time of looking directly at a child on a sidewalk in a school zone at least 10% of the time).

The UE 802 may compare a current attention pattern against a typical attention pattern to adjust the sensitivity of the ADAS 810 of the vehicle, for example increasing or decreasing the sensitivity based on the comparison. For example, if the current attention pattern diverges by over a first threshold amount from the typical attention pattern, but under a second threshold amount, the UE 802 may increase the sensitivity of the ADAS 810 by a third threshold amount, and if the current attention pattern diverges by over the second threshold amount from the typical attention pattern, the UE 802 may increase the sensitivity of the ADAS 810 by a fourth threshold amount. Conversely, if the current attention pattern diverges from the typical attention pattern by under the first threshold amount for a period of time (e.g., 5 minutes), or if the context of the UE 802 changes (e.g., moving from a freeway to a city street, or from a city street to a school zone), the UE 802 may then reset, or reduce the sensitivity of the ADAS 810 to a default value associated with that context. In some aspects, the UE 802 may adjust a sensitivity of the ADAS in a direction or a location, while leaving the sensitivity of the ADAS alone on other directions or other locations. For example, if the UE 802 determines that the gaze pattern of the driver 804 with respect to one direction or location diverges from the typical gaze pattern by at least a threshold amount (e.g., typical gaze pattern is at least 20% in a direction over a period of time but the current gaze pattern is 10% in that direction over a current period of time) and the gaze pattern of the driver 804 with respect to other directions/locations does not diverge from the typical gaze pattern by at least the threshold amount, the UE 802 may increase the sensitivity of the ADAS for events associated with the divergent direction/location and may not adjust the sensitivity of the ADAS for events associated with the other directions/locations with respect to the driver 804 and/or the vehicle.

In one example, the UE 802 may analyze the gaze pattern of the driver 804 over a period of time, and may associate the gaze pattern with a driver ID associated with the driver 804. If the current gaze pattern of the driver 804 during the period of time does not diverge from the selected typical gaze pattern of the driver 804 during the period of time, the UE 802 may update the selected typical gaze pattern of the driver 804 using the current gaze pattern, further improving the set of data that is associated with the driver 804. If the current gaze pattern of the driver 804 during the period of time does diverges from the selected typical gaze pattern of the driver 804 during the period of time, the UE 802 may increase the sensitivity of the ADAS based on the divergence, for example by increasing the sensitivity of the ADAS in all directions/locations with respect to the driver 804, or by increasing the sensitivity of the ADAS in a particular direction/location associated with the divergence with respect to the driver 804. After the sensitivity has been increased, if the current gaze pattern of the driver 804 during another period of time does not diverge from a selected typical gaze pattern of the driver 804 for a period of time, the UE 802 may decrease, or reset, the sensitivity of the ADAS.

FIG. 11 is a flowchart 1100 of a method of wireless communication. The method may be performed by a UE (e.g., the UE 104, the UE 350, the UE 502, the UE 504, the UE 506, the UE 508, the UE 702, the UE 704, the UE 706, the UE 802; the apparatus 1404). At 1102, the UE may obtain an indication of a first gaze pattern of a driver of a vehicle from a memory. For example, 1102 may be performed by the UE 802 in FIGS. 8A-8C, which may obtain an indication of a prototypical, ideal, or default, gaze pattern of the driver 804 of the vehicle of the UE 802 from a memory of the UE 802, from the memory of another wireless device that transmits the gaze pattern to the UE 802, such as a base station or an RSU. The memory of the UE 802 may store the gaze pattern based on measurements captured by the set of sensors 806. Moreover, 1102 may be performed by the component 198 in FIG. 1, 3, 5, 7, or 14.

At 1104, the UE may obtain a second gaze pattern of the driver of the vehicle based on a first set of sensor data from a first set of sensors associated with the vehicle during a first period of time. For example, 1104 may be performed by the UE 802 in FIGS. 8A-8C, which may obtain a current gaze pattern of the driver 804 of the vehicle of the UE 802 based on a first set of sensor data from the set of sensors 806 associated with the vehicle during a period of time, for example the last 5 seconds when gaze pattern data was captured of the driver 804. An analyzed gaze pattern may be for different periods of time (e.g., a 5-second period of time, a collection of 5-second periods of time, or a 5-minute period of time). Moreover, 1104 may be performed by the component 198 in FIG. 1, 3, 5, 7, or 14.

At 1106, the UE may adjust a sensitivity of an ADAS associated with the vehicle in response to a difference of visual engagement in a visual zone of the driver between the second gaze pattern and the first gaze pattern that is greater or equal than a threshold amount. For example, 1106 may be performed by the UE 802 in FIGS. 8A-8C, which may adjust a sensitivity of an ADAS 810 associated with the vehicle in response to a difference of visual engagement in a visual zone of the driver, for example the visual zone 836 in FIG. 8B or the visual zone 916 in FIG. 9, between the current gaze pattern of the driver 804 and the typical gaze pattern of the driver 804 that is greater or equal than a threshold amount, for example greater than 10% or greater than 20%. Moreover, 1106 may be performed by the component 198 in FIG. 1, 3, 5, 7, or 14.

Figure 12:
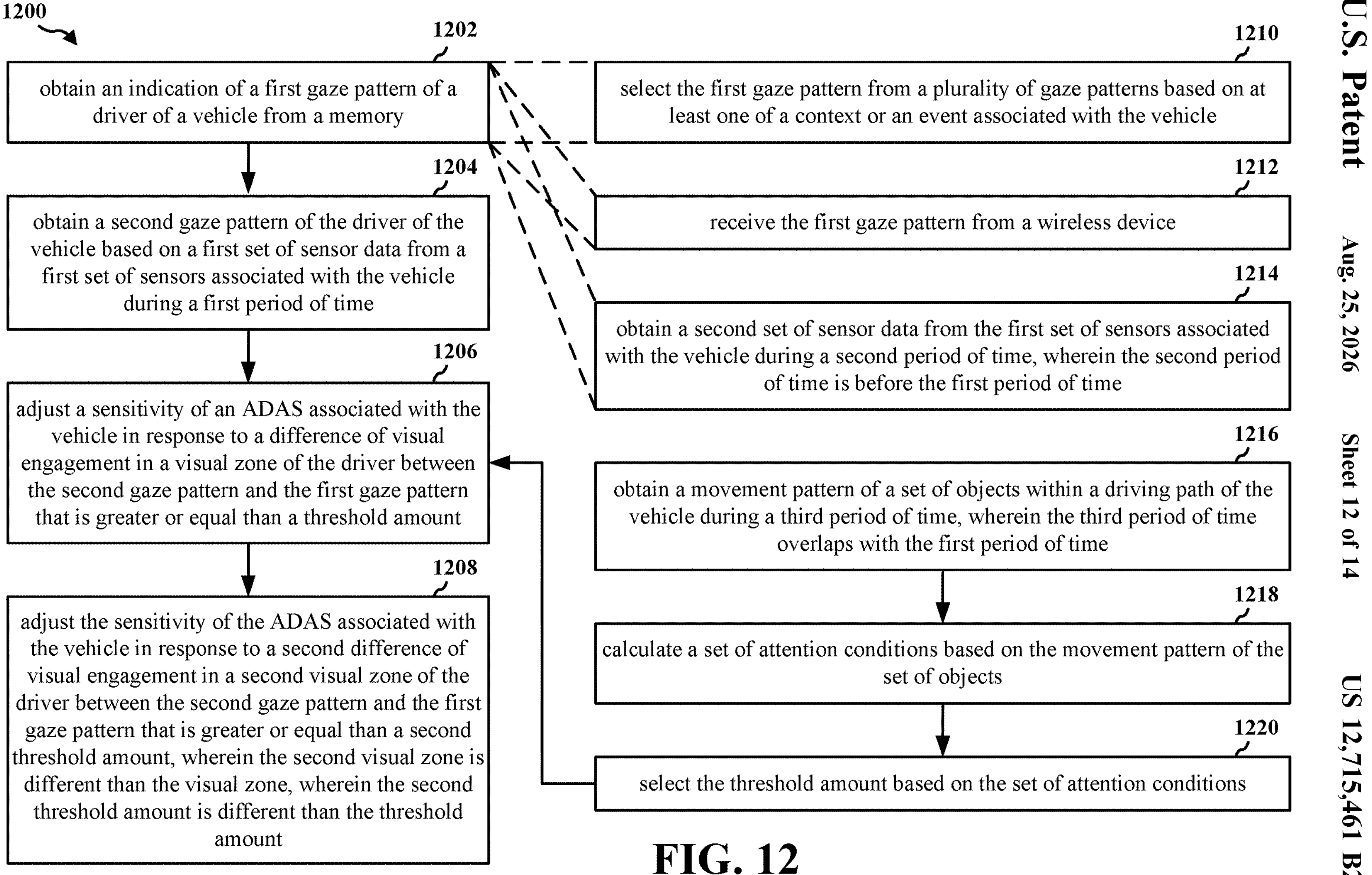
FIG. 12 is a flowchart of a method of wireless communication.

FIG. 12 is a flowchart 1200 of a method of wireless communication. The method may be performed by a UE (e.g., the UE 104, the UE 350, the UE 502, the UE 504, the UE 506, the UE 508, the UE 702, the UE 704, the UE 706, the UE 802; the apparatus 1404). At 1202, the UE may obtain an indication of a first gaze pattern of a driver of a vehicle from a memory. For example, 1202 may be performed by the UE 802 in FIGS. 8A-8C, which may obtain an indication of a prototypical, ideal, or default, gaze pattern of the driver 804 of the vehicle of the UE 802 from a memory of the UE 802.

from the memory of another wireless device that transmits the gaze pattern to the UE 802, such as a base station or an RSU. The memory of the UE 802 may store the gaze pattern based on measurements captured by the set of sensors 806. Moreover, 1202 may be performed by the component 198 in FIG. 1, 3, 5, 7, or 14.

At 1204, the UE may obtain a second gaze pattern of the driver of the vehicle based on a first set of sensor data from a first set of sensors associated with the vehicle during a first period of time. For example, 1204 may be performed by the UE 802 in FIGS. 8A-8C, which may obtain a current gaze pattern of the driver 804 of the vehicle of the UE 802 based on a first set of sensor data from the set of sensors 806 associated with the vehicle during a period of time, for example the last 5 seconds when gaze pattern data was captured of the driver 804. An analyzed gaze pattern may be for different periods of time (e.g., a 5-second period of time, a collection of 5-second periods of time, or a 5-minute period of time). Moreover, 1204 may be performed by the component 198 in FIG. 1, 3, 5, 7, or 14.

At 1206, the UE may adjust a sensitivity of an ADAS associated with the vehicle in response to a difference of visual engagement in a visual zone of the driver between the second gaze pattern and the first gaze pattern that is greater or equal than a threshold amount. For example, 1206 may be performed by the UE 802 in FIGS. 8A-8C, which may adjust a sensitivity of an ADAS 810 associated with the vehicle in response to a difference of visual engagement in a visual zone of the driver, for example the visual zone 836 in FIG. 8B or the visual zone 916 in FIG. 9, between the current gaze pattern of the driver 804 and the typical gaze pattern of the driver 804 that is greater or equal than a threshold amount, for example greater than 10% or greater than 20%. Moreover, 1206 may be performed by the component 198 in FIG. 1, 3, 5, 7, or 14.

At 1208, the UE may adjust the sensitivity of the ADAS associated with the vehicle in response to a second difference of visual engagement in a second visual zone of the driver between the second gaze pattern and the first gaze pattern that is greater or equal than a second threshold amount, wherein the second visual zone is different than the visual zone, wherein the second threshold amount is different than the threshold amount. For example, 1208 may be performed by the UE 802 in FIGS. 8A-8C, which may adjust the sensitivity of the ADAS associated with the vehicle in response to a second difference of visual engagement in a second visual zone of the driver, for example the visual zone 832 in FIG. 8B or the visual zone 912 in FIG. 9, between the current gaze pattern of the driver 804 and the typical gaze pattern of the driver 804 that is greater or equal than a second threshold amount. In other words, the threshold difference that adjusts the sensitivity of the ADAS may be different for one visual zone than another visual zone. For example, the threshold may be smaller (e.g., 10%) for a visual zone in the center of a driving path, and the threshold may be larger (e.g., 20%) for a visual zone near an edge of the driving path. Moreover, 1208 may be performed by the component 198 in FIG. 1, 3, 5, 7, or 14.

At 1210, the UE may obtain the indication of the first gaze pattern of the driver of the vehicle from the memory by selecting the first gaze pattern from a plurality of gaze patterns based on at least one of a context or an event associated with the vehicle. For example, 1210 may be performed by the UE 802 in FIGS. 8A-8C, which may obtain the indication of the first gaze pattern of the driver of the vehicle from the memory by selecting the typical gaze pattern for comparison from a plurality of typical gaze patterns based on at least one of a context or an event associated with the vehicle. For example, one typical gaze pattern of a collection of typical gaze patterns may be used for a vehicle driving within one-hundred meters of a school, while another typical gaze pattern of a collection of typical gaze patterns may be used for a vehicle driving on a freeway. In another example, one typical gaze pattern of a collection of typical gaze patterns may be used for a vehicle driving at a first speed, while another typical gaze pattern may of a collection of typical gaze patterns be used for a vehicle driving at a second speed. Moreover, 1210 may be performed by the component 198 in FIG. 1, 3, 5, 7, or 14.

At 1212, the UE may obtain the indication of the first gaze pattern of the driver of the vehicle from the memory by receiving the first gaze pattern from a wireless device. For example, 1212 may be performed by the UE 802 in FIGS. 8A-8C, which may obtain the indication of the first gaze pattern of the driver of the vehicle from the memory by receiving the typical gaze pattern from a wireless device. For example, the UE 802 may wirelessly download a default, or an idealized typical gaze pattern from a crowd sourced database accessible via a base station transmission to the UE 802. In another example, the UE 802 may wirelessly download a typical gaze pattern for the driver 804 from a user database that saves typical gaze patterns for a user of the driver 804 from a remote computer system. Moreover, 1212 may be performed by the component 198 in FIG. 1, 3, 5, 7, or 14.

At 1214, the UE may obtain the indication of the first gaze pattern of the driver of the vehicle from the memory by obtaining a second set of sensor data from the first set of sensors associated with the vehicle during a second period of time, wherein the second period of time is before the first period of time. For example, 1214 may be performed by the UE 802 in FIGS. 8A-8C, which may obtain the indication of the first gaze pattern of the driver of the vehicle from the memory by obtaining a second set of sensor data from the set of sensors 806 associated with the vehicle during a second period of time. In other words, the first set of sensor data may be sensor data that monitors the driver 804 for a first 10 second period of time, and the second set of sensor data may be sensor data that monitors the driver 804 for a second period of time. The second period of time may be before the first period of time. In other words, the typical gaze pattern used may be of the driver 804 at a previous period of time, or a mean, or median, of a collection of typical gaze patterns of the driver 804 at previous periods of time. Moreover, 1214 may be performed by the component 198 in FIG. 1, 3, 5, 7, or 14.

At 1216, the UE may obtain a movement pattern of a set of objects within a driving path of the vehicle during a third period of time, wherein the third period of time overlaps with the first period of time. For example, 1216 may be performed by the UE 802 in FIGS. 8A-8C, which may obtain a movement pattern of a set of objects that include the person 864 and the object 866 within the driving path 862 or the driving path 863 of the vehicle during a third period of time. In some aspects, a projected path of an object within the driving path 862 or the driving path 863 may be considered within the driving path 862 or the driving path 863. For example, a projected path of the person 864 to be within the driving path 862 two seconds in the future may be considered a movement pattern of the person 864 within the driving path 862. The third period of time may include the first period of time. Moreover, 1216 may be performed by the component 198 in FIG. 1, 3, 5, 7, or 14.

At 1218, the UE may calculate a set of attention conditions based on the movement pattern of the set of objects. For example, 1218 may be performed by the UE 802 in FIGS. 8A-8C, which may calculate a set of attention conditions based on the movement pattern of the set of objects. For example, the UE 802 may calculate a set of attention conditions associated with monitoring a person about to walk in front of the vehicle based on detecting that the person 864 is on a current trajectory to enter the driving path 862 or the driving path 863 of the vehicle within the next ten seconds. In another aspect, the UE 802 may calculate a set of attention conditions associated with monitoring a bicycle in a bike lane associated with monitoring a bicycle that is at least partially within the driving path 862 or the driving path 863 of the vehicle. Moreover, 1218 may be performed by the component 198 in FIG. 1, 3, 5, 7, or 14.

At 1220, the UE may select the threshold amount based on the set of attention conditions. For example, 1220 may be performed by the UE 802 in FIGS. 8A-8C, which may select the threshold amount used to trigger an adjustment of the sensitivity of the ADAS based on the set of attention conditions. For example, the set of attention conditions may include a first threshold amount for driving within one-hundred meters of a school, a second threshold amount for driving on a freeway at a first speed, and a third threshold amount for driving on a freeway at a second speed. Moreover, 1220 may be performed by the component 198 in FIG. 1, 3, 5, 7, or 14.

Figure 13:
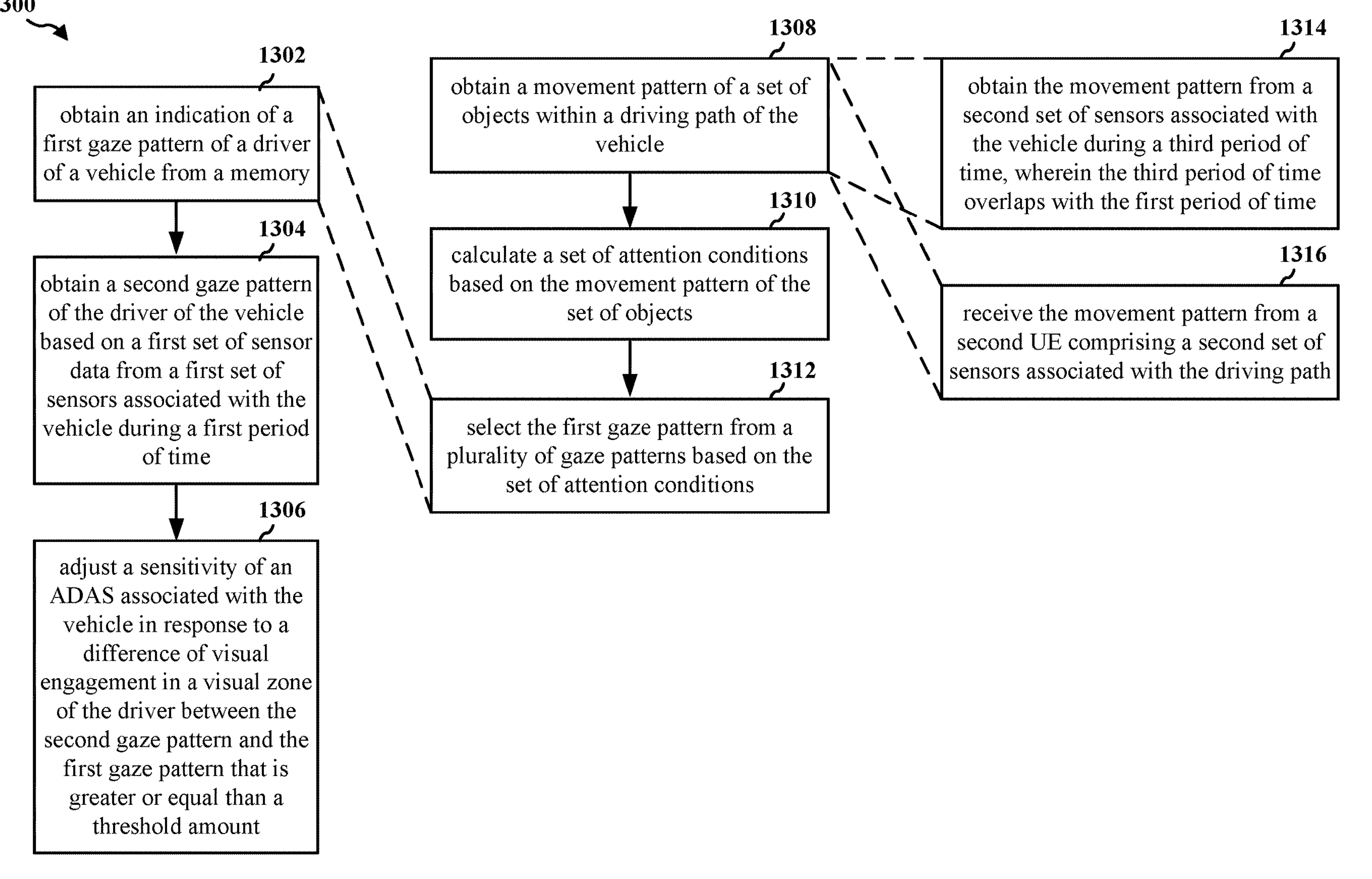
FIG. 13 is a flowchart of a method of wireless communication.

FIG. 13 is a flowchart 1300 of a method of wireless communication. The method may be performed by a UE (e.g., the UE 104, the UE 350, the UE 502, the UE 504, the UE 506, the UE 508, the UE 702, the UE 704, the UE 706, the UE 802; the apparatus 1404). At 1302, the UE may obtain an indication of a first gaze pattern of a driver of a vehicle from a memory. For example, 1302 may be performed by the UE 802 in FIGS. 8A-8C, which may obtain an indication of a prototypical, ideal, or default, gaze pattern of the driver 804 of the vehicle of the UE 802 from a memory of the UE 802, from the memory of another wireless device that transmits the gaze pattern to the UE 802, such as a base station or an RSU. The memory of the UE 802 may store the gaze pattern based on measurements captured by the set of sensors 806. Moreover, 1302 may be performed by the component 198 in FIG. 1, 3, 5, 7, or 14.

At 1304, the UE may obtain a second gaze pattern of the driver of the vehicle based on a first set of sensor data from a first set of sensors associated with the vehicle during a first period of time. For example, 1304 may be performed by the UE 802 in FIGS. 8A-8C, which may obtain a current gaze pattern of the driver 804 of the vehicle of the UE 802 based on a first set of sensor data from the set of sensors 806 associated with the vehicle during a period of time, for example the last 5 seconds when gaze pattern data was captured of the driver 804. An analyzed gaze pattern may be for different periods of time (e.g., a 5-second period of time, a collection of 5-second periods of time, or a 5-minute period of time). Moreover, 1304 may be performed by the component 198 in FIG. 1, 3, 5, 7, or 14.

At 1306, the UE may adjust a sensitivity of an ADAS associated with the vehicle in response to a difference of visual engagement in a visual zone of the driver between the second gaze pattern and the first gaze pattern that is greater or equal than a threshold amount. For example, 1306 may be performed by the UE 802 in FIGS. 8A-8C, which may adjust a sensitivity of an ADAS 810 associated with the vehicle in response to a difference of visual engagement in a visual zone of the driver, for example the visual zone 836 in FIG. 8B or the visual zone 916 in FIG. 9, between the current gaze pattern of the driver 804 and the typical gaze pattern of the driver 804 that is greater or equal than a threshold amount, for example greater than 10% or greater than 20%. Moreover, 1306 may be performed by the component 198 in FIG. 1, 3, 5, 7, or 14.

At 1308, the UE may obtain a movement pattern of a set of objects within a driving path of the vehicle. For example, 1308 may be performed by the UE 802 in FIGS. 8A-8C, which may obtain a movement pattern of a set of objects that include the person 864 or the object 866 within the driving path 862 or the driving path 863 of the vehicle. Moreover, 1308 may be performed by the component 198 in FIG. 1, 3, 5, 7, or 14.

At 1310, the UE may calculate a set of attention conditions based on the movement pattern of the set of objects. For example, 1310 may be performed by the UE 802 in FIGS. 8A-8C, which may calculate a set of attention conditions based on the movement pattern of the set of objects. Moreover, 1310 may be performed by the component 198 in FIG. 1, 3, 5, 7, or 14.

At 1312, the UE may obtain the indication of the first gaze pattern of the driver of the vehicle from a memory by selecting the first gaze pattern from a plurality of gaze patterns based on the set of attention conditions. For example, 1312 may be performed by the UE 802 in FIGS. 8A-8C, which may obtain the indication of the typical gaze pattern of the driver of the vehicle from a memory by selecting the typical gaze pattern from a plurality of typical gaze patterns based on the set of attention conditions. For example, the set of attention conditions may select one typical gaze pattern from a plurality of typical gaze patterns for a bicycle as the object 866 that is riding in a bicycle lane within the driving path 863, or projected to be within the driving path 863 within a threshold period of time, and may select a different typical gaze pattern from a plurality of typical gaze patterns if there are no objects detected within the driving path 863, or projected to be within the driving path 863 within the threshold period of time. Moreover, 1312 may be performed by the component 198 in FIG. 1, 3, 5, 7, or 14.

At 1314, the UE may obtain the movement pattern of the set of objects within the driving path of the vehicle by obtaining the movement pattern from a second set of sensors associated with the vehicle during a third period of time, wherein the third period of time overlaps with the first period of time. For example, 1314 may be performed by the UE 802 in FIGS. 8A-8C, which may obtain the movement pattern of the set of objects, including the person 864 and the object 866, within the driving path 862 or the driving path 863 of the vehicle by obtaining the movement pattern from the set of sensors 808 that monitor driving paths of the vehicle during a third period of time, wherein the third period of time overlaps with the first period of time. Moreover, 1314 may be performed by the component 198 in FIG. 1, 3, 5, 7, or 14.

At 1316, the UE may obtain the movement pattern of the set of objects within the driving path of the vehicle by receiving the movement pattern from a second UE that may include a second set of sensors associated with the driving path. For example, 1316 may be performed by the UE 802 in FIGS. 8A-8C, which may obtain the movement pattern of the set of objects within the driving path of the vehicle by receiving the movement pattern from a second UE that may include a second set of sensors associated with the driving path 863 or the driving path 862. For example, another UE driving parallel to the UE 802, such as the UE 702 driving parallel with the UE 704, may monitor objects using its own sensors. The UE 702 may transmit sensor information to the UE 704, or to the RSU 708, which may forward the received sensor information to the UE 704, for the UE 704 to use to monitor its own driving path. In this manner, other UEs around the vicinity of the UE 802 in FIG. 8A-8C may assist the UE 802 in monitoring the driving path 862 or the driving path 863 of the UE 802. Moreover, 1316 may be performed by the component 198 in FIG. 1, 3, 5, 7, or 14.

Figure 14:
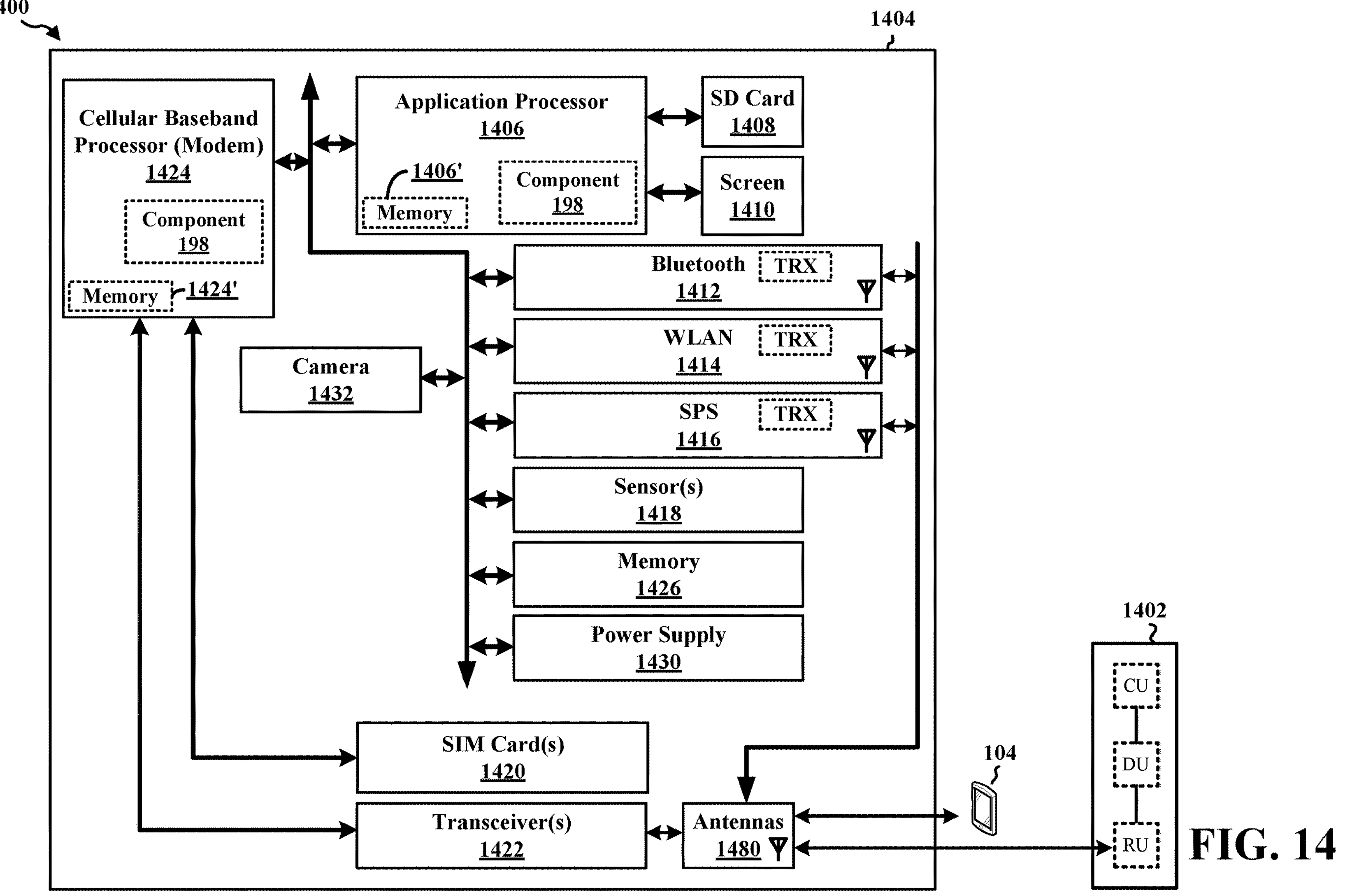
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see UE 350 of FIG. 3) and include the additional modules of the apparatus 1404.

As discussed supra, the component 198 may be configured to obtain an indication of a first gaze pattern of a driver of a vehicle from a memory. The component 198 may be configured to obtain a second gaze pattern of the driver of the vehicle based on a first set of sensor data from a first set of sensors associated with the vehicle during a first period of time. The component 198 may be configured to adjust a sensitivity of an ADAS associated with the vehicle in response to a difference of visual engagement in a visual zone of the driver between the second gaze pattern and the first gaze pattern that is greater or equal than a threshold amount. The component 198 may be within the cellular baseband processor 1424, the application processor 1406, or both the cellular baseband processor 1424 and the application processor 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, may include means for obtaining an indication of a first gaze pattern of a driver of a vehicle from at least one of a memory (e.g., the memory 1424', the memory 1406', or the memory 1426) or a wireless device. The apparatus 1404 may include means for obtaining a second gaze pattern of the driver of the vehicle based on a first set of sensor data from a first set of sensors associated with the vehicle during a first period of time. The apparatus 1404 may include means for adjusting a sensitivity of an ADAS associated with the vehicle in response to a difference of visual engagement in a visual zone of the driver between the second gaze pattern and the first gaze pattern that is greater or equal than a threshold amount. The apparatus 1404 may include means for receiving the first gaze pattern from the wireless device. The first gaze pattern may be received from the wireless device via a wireless antenna and/or a transceiver, for example the antennas 1480 and/or the one or more transceivers 1422. The apparatus 1404 may include means for obtaining the indication of the first gaze pattern by obtaining a second set of sensor data from the first set of sensors associated with the vehicle during a second period of time. The second period of time may be before the first period of time. The apparatus 1404 may include means for obtaining the indication of the first gaze pattern by selecting the first gaze pattern from a plurality of gaze patterns based on at least one of a context or an event associated with the vehicle. The context associated with the vehicle may include at least one of (a) a location of the vehicle, (b) an orientation of the vehicle, (c) a time pattern associated with the first period of time, (d) a weather pattern associated with the location of the vehicle, or (e) a road attribute associated with the location of the vehicle. The event associated with the vehicle may include at least one of (a) a presence of a set of objects within a driving path of the vehicle, (b) a movement of the set of objects within the driving path of the vehicle, or (c) a predicted movement of the set of objects within the driving path of the vehicle. The apparatus 1404 may include means for obtaining a movement pattern of a set of objects within a driving path of the vehicle. The method further comprises calculating a set of attention conditions based on the movement pattern of the set of objects, wherein obtaining the first gaze pattern comprises selecting the first gaze pattern from a plurality of gaze patterns based on the set of attention conditions. The set of attention conditions may include at least one of (a) a gaze time period associated with at least one object of the set of objects, or (b) a distance associated with at least one predicted path of at least one object of the set of objects. The apparatus 1404 may include means for obtaining the movement pattern of the set of objects within the driving path of the vehicle by obtaining the movement pattern from a second set of sensors associated with the vehicle during a third period of time, wherein the third period of time overlaps with the first period of time. The apparatus 1404 may include means for obtaining the movement pattern of the set of objects within the driving path of the vehicle by receiving the movement pattern from a second UE comprising a second set of sensors associated with the driving path. The apparatus 1404 may include means for obtaining a movement pattern of a set of objects within a driving path of the vehicle. The third period of time may overlap with the first period of time. The apparatus 1404 may include means for calculating a set of attention conditions based on the movement pattern of the set of objects. The apparatus 1404 may include means for selecting the threshold amount based on the set of attention conditions. The set of attention conditions may include at least one of (a) a gaze time period associated with at least one object of the set of objects, or (b) a distance associated with at least one predicted path of at least one object of the set of objects. The apparatus 1404 may include means for obtaining the movement pattern of the set of objects within the driving path of the vehicle by obtaining the movement pattern from a second set of sensors associated with the vehicle during a third period of time. The third period of time may overlap with the first period of time. The apparatus 1404 may include means for obtaining the movement pattern of the set of objects within the driving path of the vehicle by receiving the movement pattern from a second UE comprising a second set of sensors associated with the driving path. The apparatus 1404 may include means for adjusting the sensitivity of the ADAS associated with the vehicle in response to a second difference of visual engagement in a second visual zone of the driver between the second gaze pattern and the first gaze pattern that is greater or equal than a second threshold amount. The second visual zone may be different than the visual zone. The second threshold amount may be different than the threshold amount. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented. The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive the data, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), where the method comprises obtaining an indication of a first gaze pattern of a driver of a vehicle from at least one of the at least one memory or a wireless device. The method further comprises obtaining a second gaze pattern of the driver of the vehicle based on a first set of sensor data from a first set of sensors associated with the vehicle during a first period of time. The method further comprises adjusting a sensitivity of an advanced driver assistance system (ADAS) associated with the vehicle in response to a difference of visual engagement in a visual zone of the driver between the second gaze pattern and the first gaze pattern that is greater or equal than a threshold amount.

Aspect 2 is the method of aspect 1, wherein the method further comprises receiving the first gaze pattern from the wireless device. The first gaze pattern may be received from the wireless device via a wireless antenna and/or a transceiver.

Aspect 3 is the method of either of aspects 1 or 2, wherein obtaining the indication of the first gaze pattern comprises obtaining a second set of sensor data from the first set of sensors associated with the vehicle during a second period of time, wherein the second period of time is before the first period of time.

Aspect 4 is the method of any of aspects 1 to 3, wherein obtaining the indication of the first gaze pattern comprises selecting the first gaze pattern from a plurality of gaze patterns based on at least one of a context or an event associated with the vehicle.

Aspect 5 is the method of aspect 4, wherein the context associated with the vehicle comprises at least one of (a) a location of the vehicle, (b) an orientation of the vehicle, (c) a time pattern associated with the first period of time, (d) a weather pattern associated with the location of the vehicle, or (e) a road attribute associated with the location of the vehicle.

Aspect 6 is the method of either of aspects 4 or 5, wherein the event associated with the vehicle comprises at least one of (a) a presence of a set of objects within a driving path of the vehicle, (b) a movement of the set of objects within the driving path of the vehicle, or (c) a predicted movement of the set of objects within the driving path of the vehicle.

Aspect 7 is the method of any of aspects 1 to 6, wherein the method further comprises obtaining a movement pattern of a set of objects within a driving path of the vehicle. The method further comprises calculating a set of attention conditions based on the movement pattern of the set of objects, wherein obtaining the first gaze pattern comprises selecting the first gaze pattern from a plurality of gaze patterns based on the set of attention conditions.

Aspect 8 is the method of aspect 7, wherein the set of attention conditions comprise at least one of (a) a gaze time period associated with at least one object of the set of objects, or (b) a distance associated with at least one predicted path of at least one object of the set of objects.

Aspect 9 is the method of either of aspects 7 or 8, wherein obtaining the movement pattern of the set of objects within the driving path of the vehicle comprises obtaining the movement pattern from a second set of sensors associated with the vehicle during a third period of time, wherein the third period of time overlaps with the first period of time.

Aspect 10 is the method of either of aspects 7 or 8, wherein obtaining the movement pattern of the set of objects within the driving path of the vehicle comprises receiving the movement pattern from a second UE comprising a second set of sensors associated with the driving path.

Aspect 11 is the method of any of aspects 1 to 10, wherein the method further comprises obtaining a movement pattern of a set of objects within a driving path of the vehicle, wherein the third period of time overlaps with the first period of time. The method further comprises calculating a set of attention conditions based on the movement pattern of the set of objects. The method further comprises selecting the threshold amount based on the set of attention conditions.

Aspect 12 is the method of aspect 11, wherein the set of attention conditions comprise at least one of (a) a gaze time period associated with at least one object of the set of objects, or (b) a distance associated with at least one predicted path of at least one object of the set of objects.

Aspect 13 is the method of either of aspects 11 or 12, wherein obtaining the movement pattern of the set of objects within the driving path of the vehicle comprises obtaining the movement pattern from a second set of sensors associated with the vehicle during a third period of time, wherein the third period of time overlaps with the first period of time.

Aspect 14 is the method of either of aspects 11 or 12, wherein obtaining the movement pattern of the set of objects within the driving path of the vehicle comprises receiving the movement pattern from a second UE comprising a second set of sensors associated with the driving path.

Aspect 15 is the method of any of aspects 1 to 14, wherein the method further comprises adjusting the sensitivity of the ADAS associated with the vehicle in response to a second difference of visual engagement in a second visual zone of the driver between the second gaze pattern and the first gaze pattern that is greater or equal than a second threshold amount, wherein the second visual zone is different than the visual zone, wherein the second threshold amount is different than the threshold amount.

Aspect 16 is an apparatus for wireless communication, including: at least one memory; and at least one processor coupled to the at least one memory and, based at least in part on information stored in the at least one memory, the at least one processor, individually or in any combination, is configured to implement any of aspects 1 to 15.

Aspect 17 is the apparatus of aspect 16, further including at least one of an antenna or a transceiver coupled to the at least one processor.

Aspect 18 is an apparatus for wireless communication including means for implementing any of aspects 1 to 15.

Aspect 19 is a computer-readable medium (e.g., a non-transitory computer-readable medium) storing computer executable code, where the code when executed by at least one processor causes the at least one processor to implement any of aspects 1 to 15.

Aspect 20 is an apparatus for wireless communication at a user equipment (UE). The apparatus comprises means for obtaining an indication of a first gaze pattern of a driver of a vehicle from at least one of a memory or a wireless device. The apparatus comprises means for obtaining a second gaze pattern of the driver of the vehicle based on a first set of sensor data from a first set of sensors associated with the vehicle during a first period of time. The apparatus comprises means for adjusting a sensitivity of an advanced driver assistance system (ADAS) associated with the vehicle in response to a difference of visual engagement in a visual zone of the driver between the second gaze pattern and the first gaze pattern that is greater or equal than a threshold amount.

Aspect 21 is the apparatus of aspect 20, wherein the means for obtaining the indication of the first gaze pattern comprises means for receiving the first gaze pattern from the wireless device.

Aspect 22 is the apparatus of claim 21, further comprising a transceiver configured to receive the first gaze pattern from the wireless device.

Aspect 23 is the apparatus of claim 21, wherein the apparatus further comprises means for obtaining a movement pattern of a set of objects within a driving path of the vehicle. The apparatus further comprises means for calculating a set of attention conditions based on the movement pattern of the set of objects, wherein selecting the first gaze pattern is further based on the set of attention conditions.

Aspect 24 is a computer-readable medium storing computer executable code at a user equipment (UE), the code when executed by at least one processor causes the at least one processor to obtain an indication of a first gaze pattern of a driver of a vehicle from at least one of a memory or a wireless device, obtain a second gaze pattern of the driver of the vehicle based on a first set of sensor data from a first set of sensors associated with the vehicle during a first period of time, and adjust a sensitivity of an advanced driver assistance system (ADAS) associated with the vehicle in response to a difference of visual engagement in a visual zone of the driver between the second gaze pattern and the first gaze pattern that is greater or equal than a threshold amount.

What is claimed is:

1. An apparatus for wireless communication at a user equipment (UE), comprising:

at least one memory; and at least one processor coupled to the at least one memory and, based at least in part on information stored in the at least one memory, the at least one processor is configured to:

obtain an indication of a plurality of gaze patterns of a driver of a vehicle from at least one of the at least one memory or a wireless device, wherein each gaze pattern of the plurality of gaze patterns comprises a percent of time the driver looks in each visual zone of a plurality of visual zones associated with the driver;

obtain a movement pattern of a set of objects within a driving path of the vehicle during a third period of time, wherein the third period of time overlaps with a first period of time;

calculate a set of attention conditions based on the movement pattern of the set of objects;

select a threshold amount based on the set of attention conditions;

select a gaze pattern from the plurality of gaze patterns based on at least one of a context or an event associated with the vehicle;

obtain a second gaze pattern of the driver of the vehicle based on a first set of sensor data from a first set of sensors associated with the vehicle during the first period of time;

adjust a sensitivity threshold of an advanced driver assistance system (ADAS) associated with the vehicle in response to a difference of visual engagement in a visual zone of the driver between the second gaze pattern and the first gaze pattern that is greater or equal than the threshold amount;

detect, via the ADAS, a threat event based on the adjusted sensitivity threshold; and trigger an ADAS action at the vehicle based on the detected threat event.

2. The apparatus of claim 1, further comprising a transceiver coupled to the at least one processor, wherein, to obtain the indication of the first gaze pattern, the at least one processor is configured to:

receive, via the transceiver, the first gaze pattern from the wireless device.

3. The apparatus of claim 1, wherein, to obtain the indication of the first gaze pattern, the at least one processor is configured to:

obtain a second set of sensor data from the first set of sensors associated with the vehicle during a second period of time, wherein the second period of time is before the first period of time.

4. The apparatus of claim 1, wherein the context associated with the vehicle comprises at least one of:

a location of the vehicle, an orientation of the vehicle, a time pattern associated with the first period of time, a weather pattern associated with the location of the vehicle, or a road attribute associated with the location of the vehicle.

5. The apparatus of claim 1, wherein the event associated with the vehicle comprises at least one of:

a presence of the set of objects within the driving path of the vehicle, a movement of the set of objects within the driving path of the vehicle, or a predicted movement of the set of objects within the driving path of the vehicle.

6. The apparatus of claim 1, wherein, to select the first gaze pattern from the plurality of gaze patterns based on at least one of the context or the event associated with the vehicle, the at least one processor is configured to:

select the first gaze pattern from the plurality of gaze patterns further based on the set of attention conditions.

7. The apparatus of claim 6, wherein the set of attention conditions comprises at least one of:

a gaze time period associated with at least one object of the set of objects; or a distance associated with at least one predicted path of the at least one object of the set of objects.

8. The apparatus of claim 6, wherein, to obtain the movement pattern of the set of objects within the driving path of the vehicle, the at least one processor is configured to:

obtain the movement pattern from a second set of sensors associated with the vehicle during a fourth period of time, wherein the fourth period of time overlaps with the first period of time.

9. The apparatus of claim 6, wherein, to obtain the movement pattern of the set of objects within the driving path of the vehicle, the at least one processor is configured to:

receive the movement pattern from a second UE comprising a second set of sensors associated with the driving path.

10. The apparatus of claim 1, wherein, to adjust the sensitivity threshold of the ADAS associated with the vehicle, the at least one processor configured to:

adjust the sensitivity of the ADAS associated with the vehicle further in response to a second difference of visual engagement in a second visual zone of the driver between the second gaze pattern and the first gaze pattern that is greater or equal than a second threshold amount, wherein the second visual zone is different than the visual zone, wherein the second threshold amount is different than the threshold amount.

11. The apparatus of claim 1, wherein the ADAS action comprises at least one of:

applying brakes to the vehicle;

displaying a visual alert to the driver of the vehicle;

activating an audio alert to the driver of the vehicle; or turning a steering wheel of the vehicle.

12. The apparatus of claim 1, wherein, to trigger the ADAS action at the vehicle based on the detected threat event, the at least one processor is configured to:

detect whether the driver of the vehicle is looking at a threat of the threat event; and trigger the ADAS action at the vehicle in response to the detection that the driver of the vehicle is looking at the threat of the threat event.

13. A method at a user equipment (UE), comprising:

obtaining an indication of a plurality of gaze patterns of a driver of a vehicle from at least one of a memory or a wireless device, wherein each gaze pattern of the plurality of gaze patterns comprises a percent of time the driver looks in each visual zone of a plurality of visual zones associated with the driver;

obtaining a movement pattern of a set of objects within a driving path of the vehicle during a third period of time, wherein the third period of time overlaps with a first period of time;

calculating a set of attention conditions based on the movement pattern of the set of objects;

selecting a threshold amount based on the set of attention conditions;

selecting a gaze pattern from the plurality of gaze patterns based on at least one of a context or an event associated with the vehicle;

obtaining a second gaze pattern of the driver of the vehicle based on a first set of sensor data from a first set of sensors associated with the vehicle during the first period of time;

adjusting a sensitivity threshold of an advanced driver assistance system (ADAS) associated with the vehicle in response to a difference of visual engagement in a visual zone of the driver between the second gaze pattern and the first gaze pattern that is greater or equal than the threshold amount;

detecting, via the ADAS, a threat event based on the adjusted sensitivity threshold; and triggering an ADAS action at the vehicle in response to the detected threat event.

14. The method of claim 13, wherein obtaining the indication of the first gaze pattern comprises:

receiving the first gaze pattern from the wireless device.

15. The method of claim 13, wherein obtaining the indication of the first gaze pattern comprises:

obtaining a second set of sensor data from the first set of sensors associated with the vehicle during a second period of time, wherein the second period of time is before the first period of time.

16. The method of claim 13, wherein the context associated with the vehicle comprises at least one of:

a location of the vehicle, an orientation of the vehicle, a time pattern associated with the first period of time, a weather pattern associated with the location of the vehicle, or a road attribute associated with the location of the vehicle.

17. The method of claim 13, wherein the event associated with the vehicle comprises at least one of:

a presence of the set of objects within the driving path of the vehicle, a movement of the set of objects within the driving path of the vehicle, or a predicted movement of the set of objects within the driving path of the vehicle.

18. The method of claim 13, wherein selecting the first gaze pattern from the plurality of gaze patterns based on at least one of the context or the event associated with the vehicle comprises:

selecting the first gaze pattern from the plurality of gaze patterns further based on the set of attention conditions.

19. The method of claim 18, wherein the set of attention conditions comprise at least one of:

a gaze time period associated with at least one object of the set of objects; or a distance associated with at least one predicted path of the at least one object of the set of objects.

20. The method of claim 18, wherein obtaining the movement pattern of the set of objects within the driving path of the vehicle comprises:

obtaining the movement pattern from a second set of sensors associated with the vehicle during a fourth period of time, wherein the fourth period of time overlaps with the first period of time.

21. The method of claim 18, wherein obtaining the movement pattern of the set of objects within the driving path of the vehicle comprises:

receiving the movement pattern from a second UE comprising a second set of sensors associated with the driving path.

22. The method of claim 13, wherein adjusting the sensitivity threshold of the ADAS associated with the vehicle comprises:

adjusting the sensitivity of the ADAS associated with the vehicle further in response to a second difference of visual engagement in a second visual zone of the driver between the second gaze pattern and the first gaze pattern that is greater or equal than a second threshold amount, wherein the second visual zone is different than the visual zone, wherein the second threshold amount is different than the threshold amount.

23. An apparatus for wireless communication at a user equipment (UE) comprising:

means for obtaining an indication of a plurality of gaze patterns of a driver of a vehicle from at least one of a memory or a wireless device, wherein each gaze pattern of the plurality of gaze patterns comprises a percent of time the driver looks in each visual zone of a plurality of visual zones associated with the driver;

means for obtaining a movement pattern of a set of objects within a driving path of the vehicle during a third period of time, wherein the third period of time overlaps with a first period of time;

means for calculating a set of attention conditions based on the movement pattern of the set of objects;

means for selecting a threshold amount based on the set of attention conditions;

means for selecting a gaze pattern from the plurality of gaze patterns based on at least one of a context or an event associated with the vehicle;

means for obtaining a second gaze pattern of the driver of the vehicle based on a first set of sensor data from a first set of sensors associated with the vehicle during the first period of time;

means for adjusting a sensitivity threshold of an advanced driver assistance system (ADAS) associated with the vehicle in response to a difference of visual engagement in a visual zone of the driver between the second gaze pattern and the first gaze pattern that is greater or equal than the threshold amount;

detecting, via the ADAS, a threat event based on the adjusted sensitivity threshold; and triggering an ADAS action at the vehicle in response to the detected threat event.

24. The apparatus of claim 23, wherein the means for obtaining the indication of the first gaze pattern comprises:

means for receiving the first gaze pattern from the wireless device.

25. The apparatus of claim 24, further comprising a transceiver configured to receive the first gaze pattern from the wireless device.

26. The apparatus of claim 23, wherein selecting the first gaze pattern is further based on the set of attention conditions.

27. A non-transitory computer-readable medium storing computer executable code at a user equipment (UE), the code when executed by at least one processor causes the at least one processor to:

obtain an indication of a plurality of gaze patterns of a driver of a vehicle from at least one of a memory or a wireless device, wherein each gaze pattern of the plurality of gaze patterns comprises a percent of time the driver looks in each visual zone of a plurality of visual zones associated with the driver;

obtain a movement pattern of a set of objects within a driving path of the vehicle during a third period of time, wherein the third period of time overlaps with a first period of time;

calculate a set of attention conditions based on the movement pattern of the set of objects;

select a threshold amount based on the set of attention conditions;

select a gaze pattern from the plurality of gaze patterns based on at least one of a context or an event associated with the vehicle;

obtain a second gaze pattern of the driver of the vehicle based on a first set of sensor data from a first set of sensors associated with the vehicle during the first period of time;

adjust a sensitivity threshold of an advanced driver assistance system (ADAS) associated with the vehicle in response to a difference of visual engagement in a visual zone of the driver between the second gaze pattern and the first gaze pattern that is greater or equal than the threshold amount;

detect, via the ADAS, a threat event based on the adjusted sensitivity threshold; and trigger an ADAS action at the vehicle in response to the detected threat event.

* * * * *